(12) United States Patent
Bamber et al.

(10) Patent No.: US 7,607,413 B2
(45) Date of Patent: Oct. 27, 2009

(54) INDUCTION SYSTEM FOR AN INTERNAL COMBUSTION ENGINE

(76) Inventors: Charlie Bamber, Point to Point House, Claydon Road Mollington, Oxfordshire (GB) OX17 1JP; Philip Virr, Cravens Arms, St. James Court, Market Hill, Southam, Warwickshire (GB) CV47 0FL; Stuart Lever, 11 Fluellen Place, Bicester, Oxon (GB) OX26 9ZE; Jon Hilton, Lower Field Barn, Clump Lane, Horley, Banbury (GB) OX15 6AX ( * ) Notice: Subject to any disclaimer, the term of this patent is extended or adjusted under 35 U.S.C. 154(b) by 123 days.

(21) Appl. No.: 10/594,857

(22) PCT Filed: Mar. 20, 2004

(86) PCT No.: PCT/US2004/009601

§ 371 (c)(1),
(2), (4) Date: Oct. 22, 2007

(87) PCT Pub. No.: WO2005/106236

PCT Pub. Date: Nov. 10, 2005

(65) Prior Publication Data

US 2008/0184953 A1    Aug. 7, 2008

(51) Int. Cl.
F02M 35/10 (2006.01)

(52) U.S. Cl. .............................. 123/184.53; 123/184.21

(58) Field of Classification Search ................. 123/336, 123/184.21, 184.53
See application file for complete search history.

(56) References Cited

U.S. PATENT DOCUMENTS

| 5,571,242 A | 11/1996 | Demorest |
| 5,595,062 A | 1/1997 | Chabry |
| 5,662,086 A | 9/1997 | Piccinini |

*Primary Examiner*—Noah Kamen
(74) *Attorney, Agent, or Firm*—R. Randall Frisk

(57) ABSTRACT

An induction system for an internal combustion engine, having a combustion chamber and an intake port in periodic communication with the combustion chamber, includes an intake tube having a lower trumpet (41) and an upper trumpet (42), each having an upper end, a lower end and a length; a transition section (43) extending between the upper end of the lower trumpet and the lower end of the upper trumpet; wherein the lower trumpet is connectable at its lower end to the intake port (22) of an engine and has an inner transition diameter (48) proximal its upper end, and wherein the upper trumpet has an inner expansion diameter (55) that is between about 68 percent and 217 percent greater than the transition diameter.

23 Claims, 25 Drawing Sheets

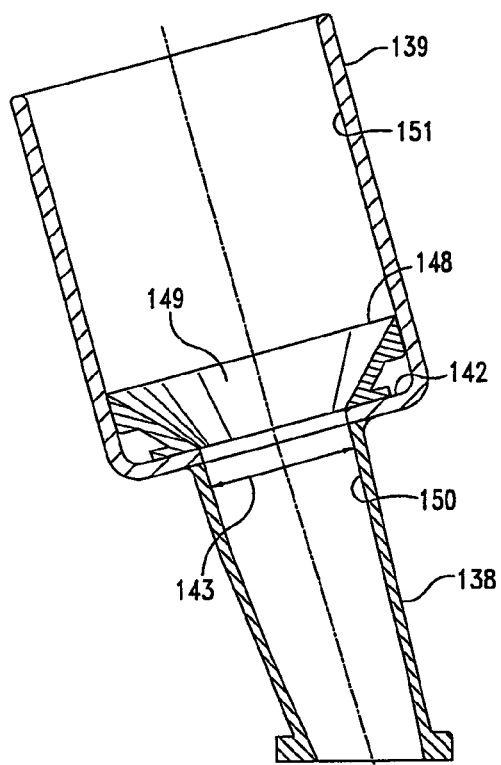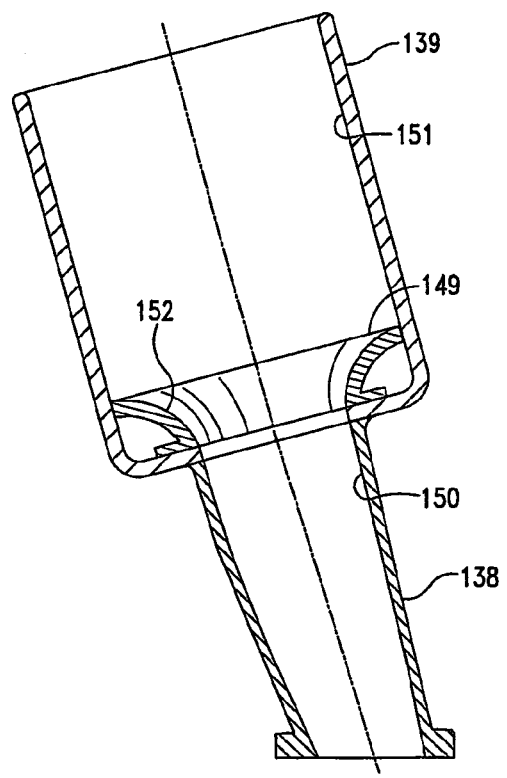
*Fig. 19*  *Fig. 20*

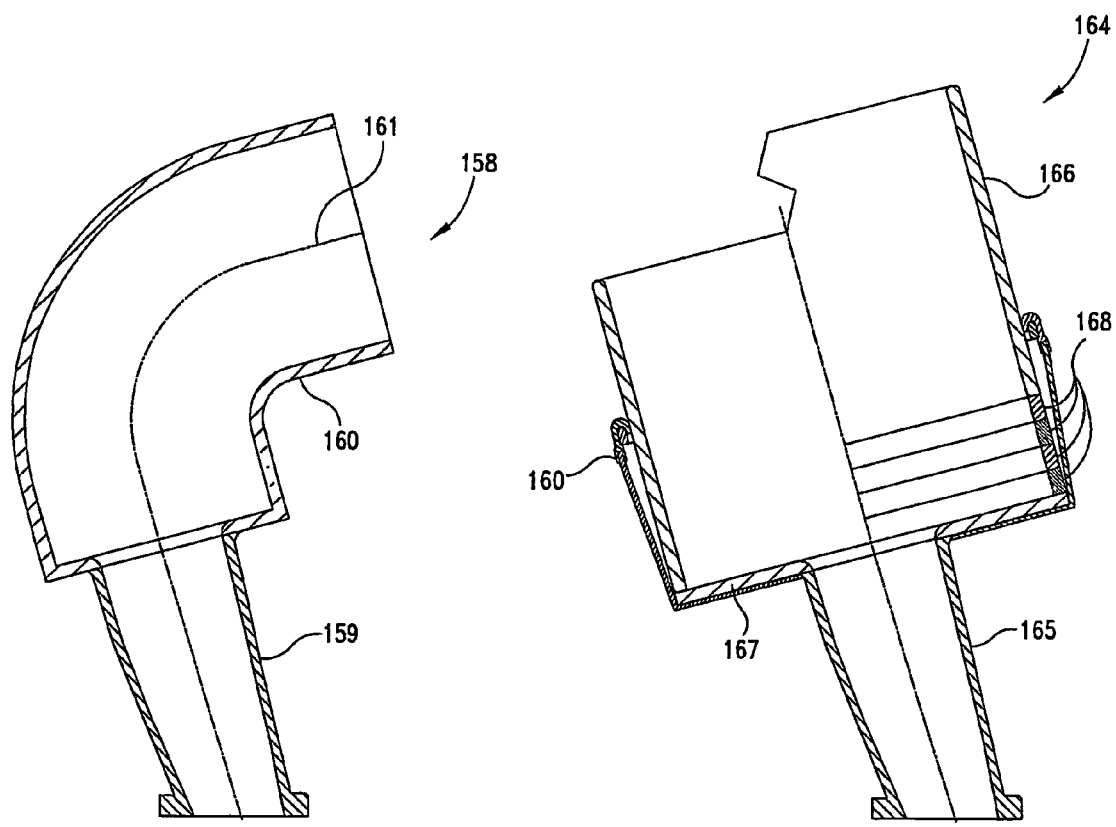
*Fig. 21*  *Fig. 22*

US 7,607,413 B2

INDUCTION SYSTEM FOR AN INTERNAL COMBUSTION ENGINE

CROSS-REFERENCE TO RELATED APPLICATION

The present application is a national stage of International Patent Application No. PCT/US2004/0099601 filed Mar. 30, 2004 (which was published in English), which is incorporated herein by reference in its entirety.

FIELD OF THE INVENTION

The present invention relates to the field of engines, and more specifically, to an induction system for an internal combustion piston engine.

BACKGROUND OF THE INVENTION

Piston engines, such as a four-stroke, normally aspirated piston engine, achieve 100% volumetric efficiency when the volume of air or fuel/air mixture, at atmospheric pressure, taken into the combustion chamber is equal to the volume of the combustion chamber. Street vehicles customarily achieve a volumetric efficiency of about 70 to 90%, while high performance or racing engines will operate between 90% and 120%. Increasing volumetric efficiency increases the volume of the fuel/air mixture being ignited in the combustion chamber and, consequently, the power output of the engine goes up. One way to increase the volumetric efficiency is with turbo charging, whereby the pressure at the intake manifold is increased so that a greater mass of air or fuel/air mixture is received into the combustion chamber. Another way engine designers have sought to increase volumetric efficiency is to tune the intake manifold or tubes. That is, by varying the length and taper of the intake tubes, resistance and acoustic losses to air flow through the tube can be lessened. Improvements are continually being sought by engine developers.

SUMMARY OF THE INVENTION

Generally speaking, an induction system is provided for an internal combustion engine that includes an intake tube having a lower trumpet connected to the engine intake port and an upper trumpet connected to the lower trumpet.

In one embodiment, an induction system for an internal combustion engine, having a combustion chamber and an intake port in periodic communication with the combustion chamber, includes an intake tube having a lower trumpet and an upper trumpet, each having an upper end, a lower end and a length; a transition section extending between the upper end of the lower trumpet and the lower end of the upper trumpet; wherein the lower trumpet is connectable at its lower end to the intake port of an engine and has an inner transition diameter proximal its upper end, and wherein the upper trumpet has an inner expansion diameter that is between about 68 percent and 217 percent greater than the transition diameter.

It is an object of the present invention to provide an improved induction system for an internal combustion engine.

Other objects and advantages of the present invention will become apparent from the following description of the preferred embodiment.

BRIEF DESCRIPTION OF THE DRAWINGS

FIGS. 19 and 20 are side, cross-sectional views of inserts 149 and 152 for use in an upper trumpet 139 in accordance with alternative embodiments of the present invention.

FIGS. 21 and 22 are side, cross-sectional views of upper trumpets 158 and 164 in accordance with alternative embodiments of the present invention.

FIG. 26 is an end, partially cross-sectional view of the induction system 185 of FIG. 26 and showing trumpet extender pack 189 in the up position.

DESCRIPTION OF THE PREFERRED EMBODIMENT

Figure 1:
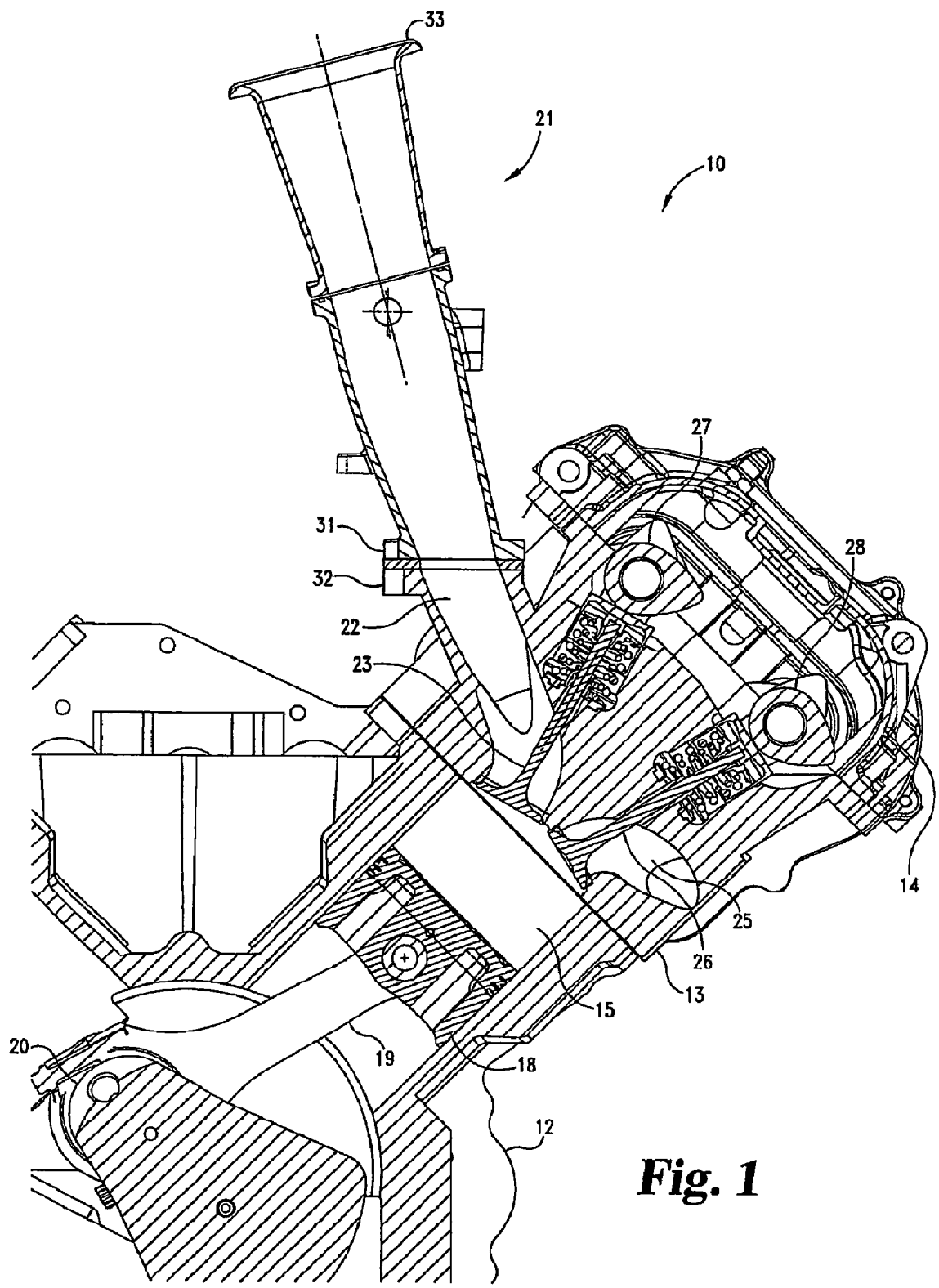
FIG. 1 is a side, cross-sectional view of a portion of a normally aspirated piston engine 10 taken through the approximate centerline of one of the cylinders and showing a typical intake tube 21.

For the purposes of promoting an understanding of the principles of the invention, reference will now be made to the embodiments illustrated in the drawings and specific language will be used to describe the same. It will nevertheless be understood that no limitation of the scope of the invention is thereby intended, and any alterations or modifications in the illustrated device, and any further applications of the principles of the invention as illustrated therein are contemplated as would normally occur to one skilled in the art to which the invention relates.

Referring now to FIG. 1, there is shown a cross-sectional view through one cylinder in a typical, normally aspirated, internal combustion piston engine 10. Such engines are well known and generally include an engine or cylinder block 12, a cylinder head 13 and a cam cover 14, which together define one or more cylinders or combustion chambers 15. The basic concept in such engine is to ignite an air/fuel mixture in chamber 15 so it rapidly expands and is converted to mechanical work by pushing against a piston 18 that reciprocates within chamber 15. The moving piston 18 connects via a piston rod 19 to a crankshaft 20 to transmit this reciprocating motion into a turning, or rotary motion. (Rotary engines likewise convert the energy from the expanding gas to rotary motion, but in a different way. The present invention nevertheless is contemplated for use with rotary engines and other internal combustion engines). The air in the air/fuel mixture is received by chamber 15 through an intake manifold or tube 21 and then through an intake port 22 defined in head 13. Intake port 22 is in communication with chamber 15, and air (or air/fuel) flow therethrough is controlled by at least one intake valve 23. Likewise, exhaust from chamber 15 exits through an exhaust port 25 defined in head 13, with the exhaust flow being controlled by at least one exhaust valve 26. Valves 23 and 26 are spring biased in the up or closed position (as shown), and overhead cams 27 and 28 control the opening and closing of valves 22 and 26, respectively.

In operation, atomized fuel is mixed with air either directly in chamber 15 or prior to intake valve 22 (such as in intake port 22 or intake tube 21). The air/fuel mixture is then trapped in chamber 15 (by valves 23 and 26 closing), compressed by the upstroke of piston 18, and ignited by an appropriate mechanism, such as a spark plug (not shown). The burning air/fuel mixture expands and drives piston 18 down its cylinder 15 to drive the crankshaft 20. One way to increase the engine's horsepower is to improve its volumetric efficiency, that is, the ratio of the actual mass of mixture taken into the engine to the mass the engine's displacement would hold at atmospheric pressure if there were no losses. One way to improve volumetric efficiency is to tune the intake tube 21 by varying its length from its inboard end 31 at its connection to the intake mount 32 of cylinder head 13 to its outboard end 33. With the opening and closing of intake valve 23, sudden pressure differences produce shock waves that travel up intake tube 20 and are reflected back from the pressure reservoir (the atmosphere) at the top end 33 of tube 20. Positive pressure waves that arrive back to cylinder 15 while valve 23 is still open can increase the mass of fuel/air mixture pulled into chamber 15. Varying the length of intake tube 21 varies the timing of such reflected waves. Consequently, varying the length of an intake tube can alter the volumetric efficiency of the engine, but such effect is also dependant on other parameters such as the valve timing and engine rpm.

Figure 2:
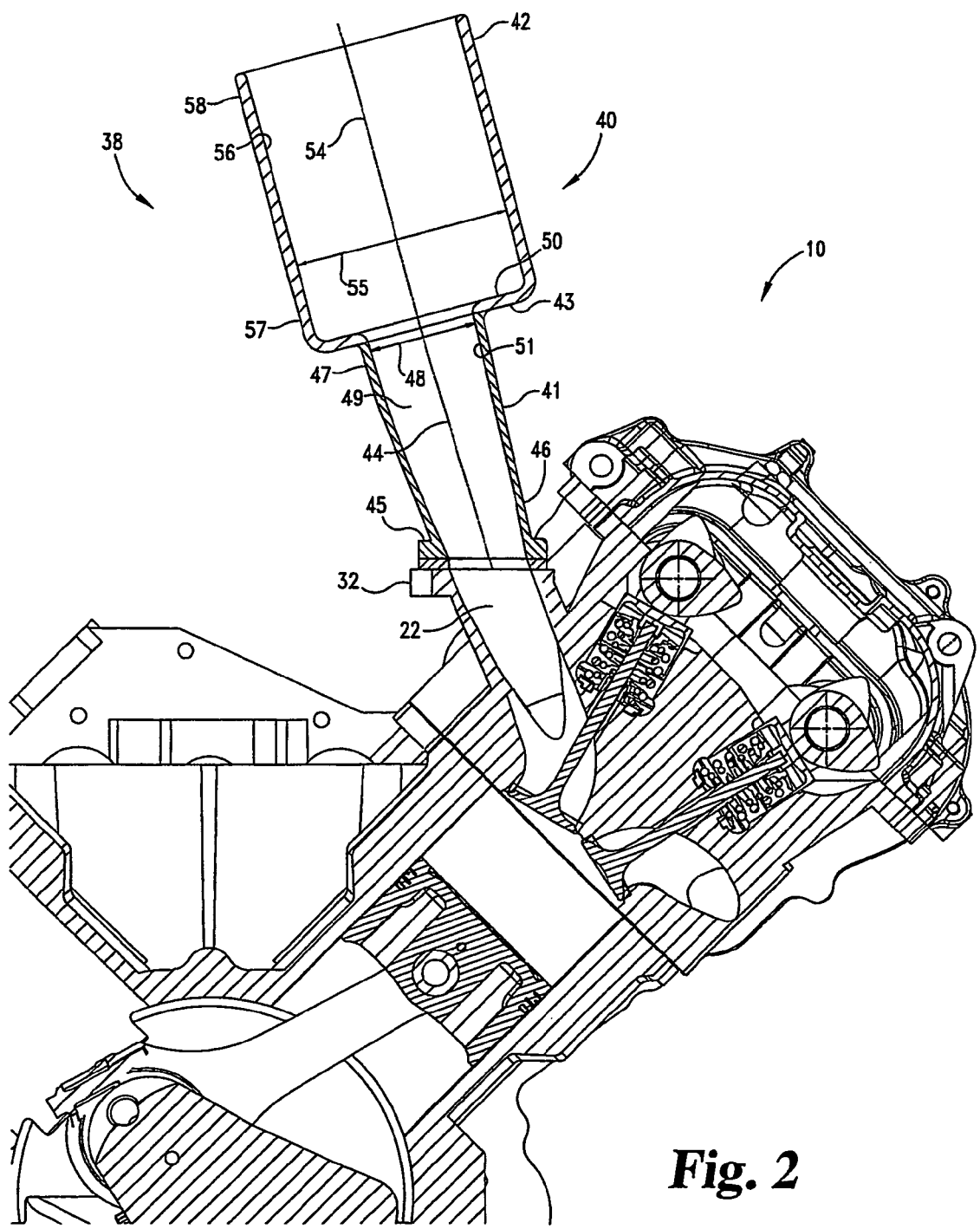
FIG. 2 is a side, cross-sectional view of a portion of a normally aspirated, piston engine 10 taken through the approximate centerline of one of the cylinders and showing an induction system 38 in accordance with one embodiment of the present invention.

Referring to FIG. 2 there is shown the same cross-sectional view through cylinder 15 of engine 10 from FIG. 1, but showing an induction system 38 in accordance with the present invention. In this embodiment, induction system 38 comprises an intake tube 40 connected in communication with the intake port 22 of engine 10. Intake tube 40 is a two stage intake tube having a primary or lower trumpet 41 and a secondary or upper trumpet 42, with a transition section 43 connecting the two together. Lower trumpet 41 has an axis or centerline 44 and a lower connection flange 45 at its bottom, lower or inboard end 46 that is configured for fixed connection to intake mount 32. The inside diameter of lower trumpet 41 increases slightly from its connection at flange 45 up to its top, upper or outboard end 47 at transition section 43 where, just below transition section 43, it has an inner transition diameter 48. For purposes of discussion, the transition diameter is the diameter at the top end of the lower trumpet of any embodiment herein, just below the transition section where the diameter increases greatly from lower to upper trumpet. As used herein, the term "primary trumpet" may be used to refer to the lower tube (i.e. 41) and its connection flange (45) and the term "secondary trumpet" may be used to refer to the combination of the upper tube (42) and its transition section (43). Also, the terms "upper", "outboard" and "top" are used interchangeably herein with regard to the trumpets or tubes to mean a section or end thereof that is farthest from the engine's combustion chamber. Likewise, the terms "lower", "inboard" and "bottom" are used interchangeably herein with regard to the trumpets or tubes to mean a section or end thereof that is nearest the engine's combustion chamber.

The shape of lower trumpet 41 may vary from that shown in FIG. 2. That is, the intake passageway 49 defined by lower trumpet 41 may be curved or straight; it may be symmetrical or asymmetrical about its centerline 44; or, it may be of tapering, diverging or constant diameter about its centerline 44. Transition section 43 extends radially outwardly from lower trumpet 41, the floor 50 of transition section 43 being substantially orthogonal to centerline 44. Upper trumpet 42 has a centerline or axis 54, has an inner expansion diameter 55, is cylindrically shaped, has a cylindrical inner wall 56 and lower and upper ends 57 and 58, respectively. Expansion diameter 55 is constant along the length of upper trumpet 42. The cylindrical inner wall 56 of upper trumpet 42 is substantially orthogonal to floor 50. In the embodiment of FIG. 2, the upper trumpet diameter 55 is approximately 2.07 times larger or 107 percent greater than the transition diameter 48 of lower trumpet 41. It is preferred that upper trumpet diameter 55 be between about 68 percent and 217 percent greater than transition diameter 48, and more preferably between about 90 percent and 130 percent greater than transition diameter 48. In the embodiment of FIG. 2, upper trumpet 42 is preferred to be cylindrical with its centerline 54 being its axis aligned with centerline 41.

As a result of the sudden diametric increase from lower trumpet 41 to upper trumpet 42, a second shock wave reflection is produced which adds to the effect of the still present first shock wave, both first and second shock wave reflections arriving to increase the mass of fuel/air mixture received in chamber 15 before intake valve 23 closes, thereby increasing volumetric efficiency.

The axial length of upper and lower trumpets 41 and 42 may vary, as desired, in accordance with known intake manifold tuning principles. In one embodiment, the axial length of upper trumpet 42 is about 100 mm. The length of lower trumpet 41 will then be selected to best tune the entire intake tube 40 to the particular engine with which it is to be used. For example, if the testing of an engine 10 determines that a 202 mm overall intake tube length is called for, and upper trumpet 42 is 100 mm long, then lower trumpet 41 would be 102 mm long. Conversely, for the same 202 mm overall length, lower trumpet 41 could be 120 mm and upper trumpet 42 would be 82 mm long. Generally speaking, varying the length of upper and lower trumpets 41 and 42 varies the timing of the reflections (shockwaves), but not the their magnitude.

Figure 3:
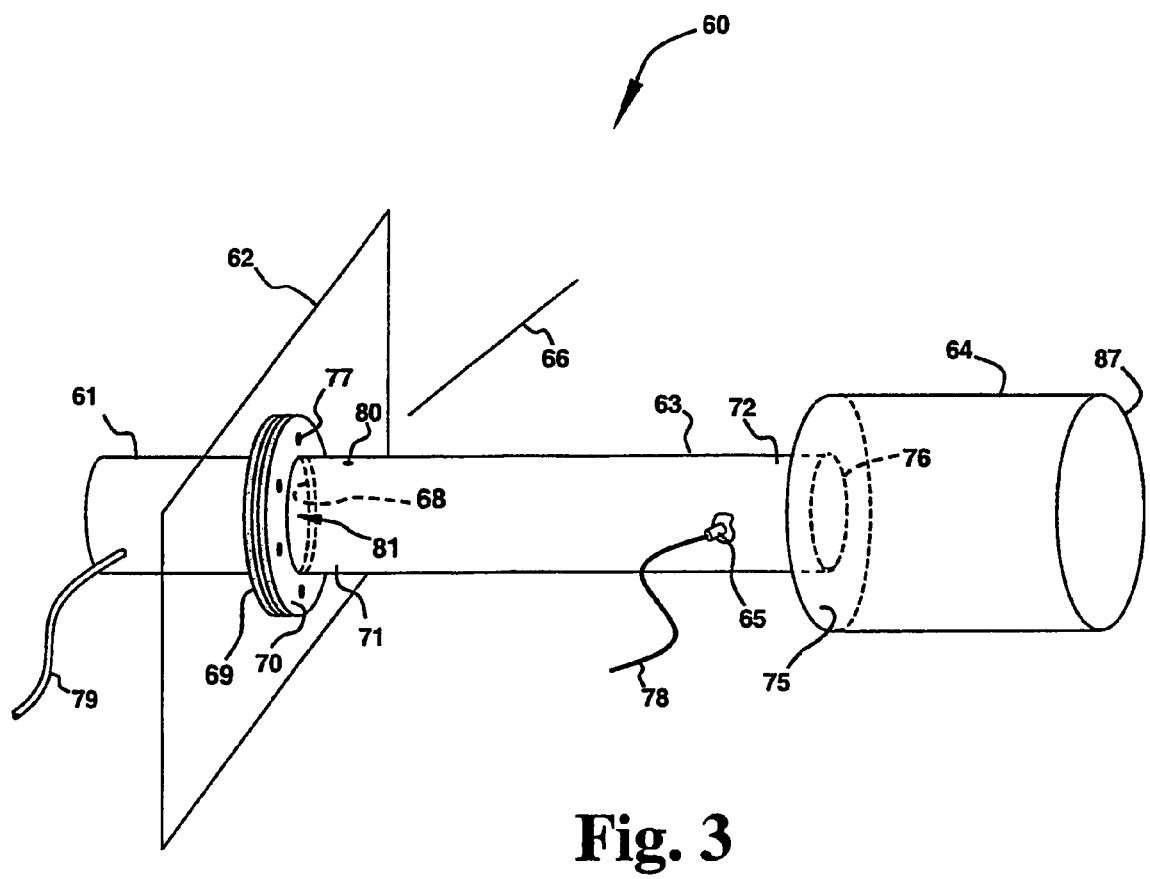
FIG. 3 is a perspective view of a shock-tube testing rig 60 for testing the acoustic characteristics of intake tube structures.

In one test procedure, a shock-tube testing rig or apparatus 60 (FIG. 3) was constructed that generally comprised a pressure reservoir 61, a puncturable membrane 62, a first tube 63, a second tube 64, a pressure transducer 65 and a puncture device 66. Reservoir 61 is completely enclosed except for an opening 68 at one end, that end having an annular flange 69 securely connected thereto. The diameter of opening 68 matches the inner diameter of annular flange 69 and first tube 63. First tube 63, which is to simulate the lower trumpet of an intake manifold in accordance with the present invention, is a cylinder of rolled card with an annular flange 70 securely, coaxially connected to its "inboard" end 71. Second tube 64 is also cylindrical rolled card with a floor 75 that defines a hole 76, which is aligned with and the same diameter as the inner diameter of second tube 64. Second tube 64, which is to simulate the upper trumpet of an intake manifold in accordance with the present invention, is securely, coaxially connected to the outboard end 72 of first tube 63, and hole 76 is essentially also the very end of first tube 63. Second tube 64 is open to atmosphere at its outboard end 87. Membrane 62 is sandwiched between flanges 69 and 70, and flanges 69 and 70 are coaxially secured together with bolts 77 so that membrane 62 closes off opening 68 of reservoir 61. Membrane 62 is any appropriate material capable of withstanding the desired positive and negative test pressures (between 0.5 bar gauge above and below atmospheric pressure) and then capable of substantially complete disintegration upon being punctured. In one test, a common potato chip package was found to meet these needs quite well. Pressure transducer 65 is a piezo-resistive transducer positioned proximal the outboard end 72 of first tube 63 to sense and relay the pressure values within tube 63. Transducer 65 was connected via cable 78 to an appropriate charge amplifier (not shown) and logged on a SOMAT data-logger (not shown) at 100 kHz.

The tests consisted of pressurizing reservoir 61 through line 79 to an appropriate pressure and then extending puncture needle 66 through a small hole 80 at about a 45 degree angle until it engages and punctures membrane 62 near the center 81 of flanges 69 and 70. Membrane 62 bursts and essentially instantaneously disintegrates within the circle of flanges 69 and 70, generating a positive pressure wave traveling out tubes 63 and 64 (to the right as viewed in FIG. 3). Satisfactory bursts were achieved when the pressure was charged to as little as 0.5 bar above or below atmospheric pressure. Some tests were conducted by evacuating the air within reservoir 61 to a depression of 0.5 bar gauge, and then bursting membrane 62 at center 81 with puncture needle 66, which generated negative pressure waves traveling down tubes 63 and 64. The latter, negative wave is reflected as a positive wave when it reaches the end of its pipe. Pressure transducer 65 recorded as many 10 complete reflections before the wave strength died away; however, it was only the initial wave and its subsequent reflection that were of interest.

In one test setup to test the effect of varying the diameter of upper trumpets 42, the diameter of first tube 63 was 47.4 mm. The length of first tube 63 is not critical, but is preferred to be between 300 mm and 600 mm long. Shock-tube tests were conducted with second tubes 64 (as upper trumpets 42) having a fixed length of 150 mm and diameters of 80, 90, 100, 110, 130, 150, 200 & 250 mm. The boundary test conditions used for this shock-tube test group are set forth in Table 1. It is understood that the parameters (boundary test conditions) used in the test are selected to determine the acoustic behavior of the intake manifold over a certain range and are not in themselves intended to be limiting as to the scope of the present invention.

TABLE 1

Secondary Intake Tube Test Conditions

| Diameter (mm) | Length (mm) | Bar Pressure (Pa) | Start Pressure (Pa) | Temp (K) |
|---|---|---|---|---|
| 80 | 150 | 97727 | 50000 | 296 |
| 90 | 150 | 97703 | 50000 | 296 |
| 100 | 150 | 97722 | 49800 | 296 |
| 110 | 150 | 97752 | 46900 | 296 |
| 130 | 150 | 97763 | 50200 | 296 |
| 150 | 150 | 97637 | 49900 | 296 |
| 200 | 150 | 97673 | 50000 | 296 |
| 250 | 150 | 97568 | 49700 | 296 |

Figure 4:
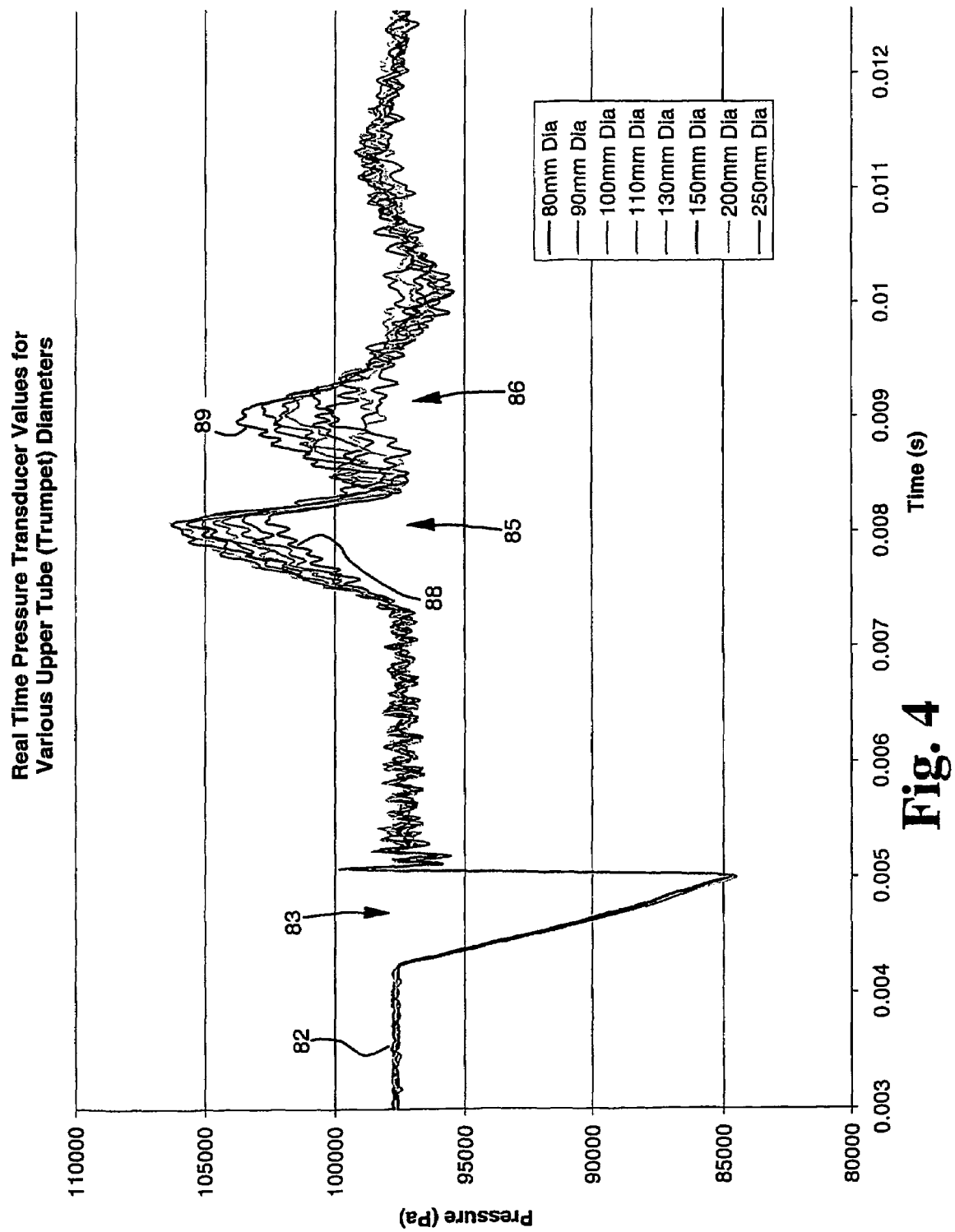
FIG. 4 is a graphical representation of the shock-tube test results for varying upper tube diameters ranging from 80-250 mm.
Figure 5:
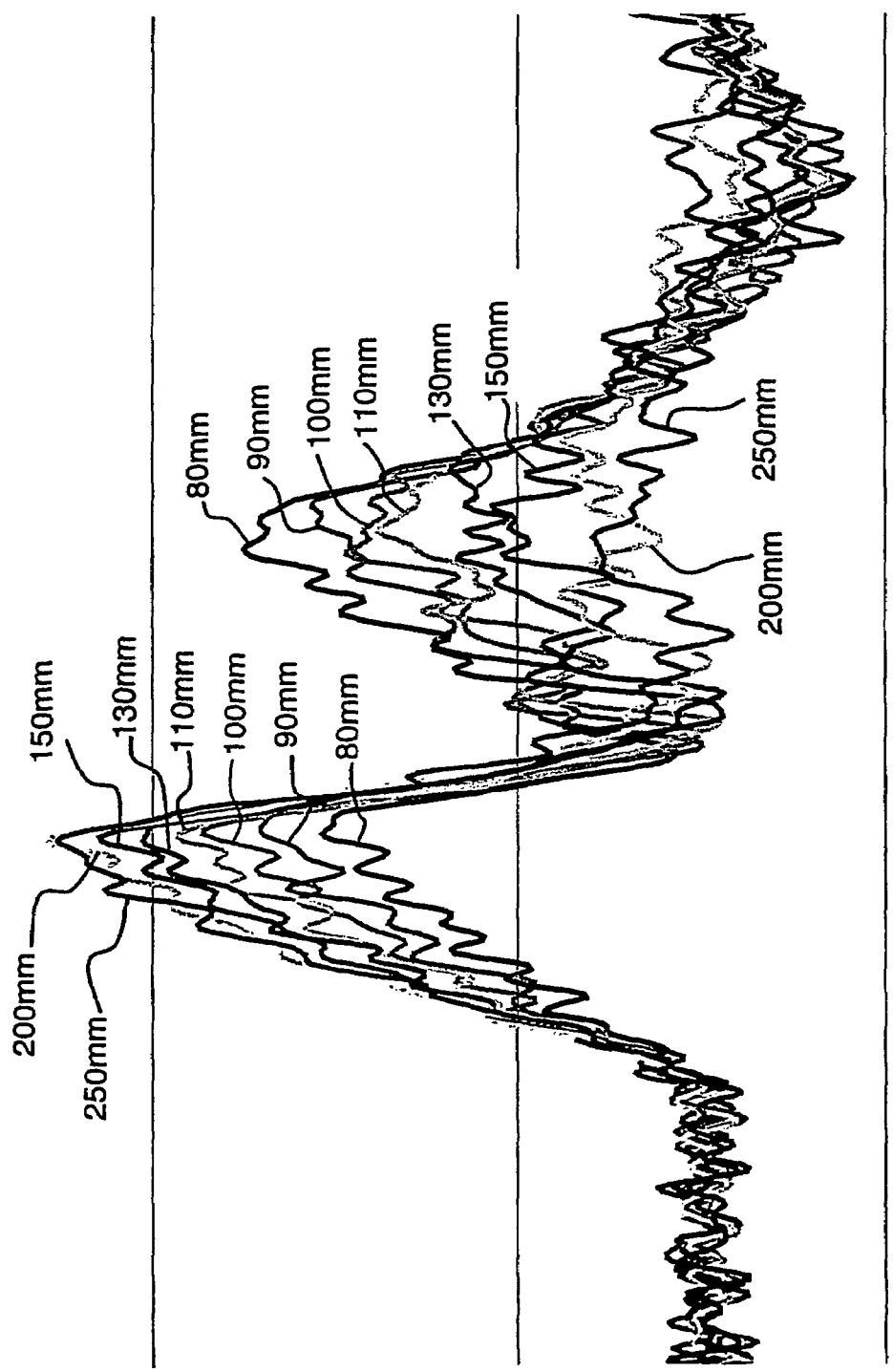
FIG. 5 is an enlarged view of a portion of the graph of FIG. 4.

FIGS. 4 and 5 show the results of the entire group of shock-tube tests with second tube diameters ranging from 80-250 mm. For each test the pressure is initially steady at atmospheric pressure (82), followed by the burst event (83), which generates a negative wave traveling down the tube 63. The waves show a double reflection resulting from the single, initial rarefaction wave. The first reflections occur (at 85) at the end 76 of the first tube 63, and the second reflections (at 86) at the end 87 of second tube 64. The smallest diameter of second tube 64 that was tested, 80 mm, displays the smallest magnitude first reflection peak (at 88), but the greatest magnitude second reflection peak (at 89), and second peak 89 is greater in magnitude than the first peak 88. As the diameter of second tube 64 increases, the magnitude of the second reflection decreases, whilst the magnitude of the first reflection increases. At the larger diameters, 200 mm and 250 mm, the magnitude of first reflection peaks are larger than the smaller diameter first reflection peaks, but the magnitude of second reflection peaks are substantially smaller than the smaller diameter second reflection peaks, almost to the point of being insignificant, as if the second tube was not present. Also, the timing of the peak pressures remains substantially constant over the range of second tube diameters. Further, the timing difference among the second reflections is significantly dependent on the second tube length. As second tube length is reduced, the second reflection (from the end 87 of second tube 64) occurs earlier. Conversely, as second tube length is increased, the second reflection occurs later.

Figure 6:
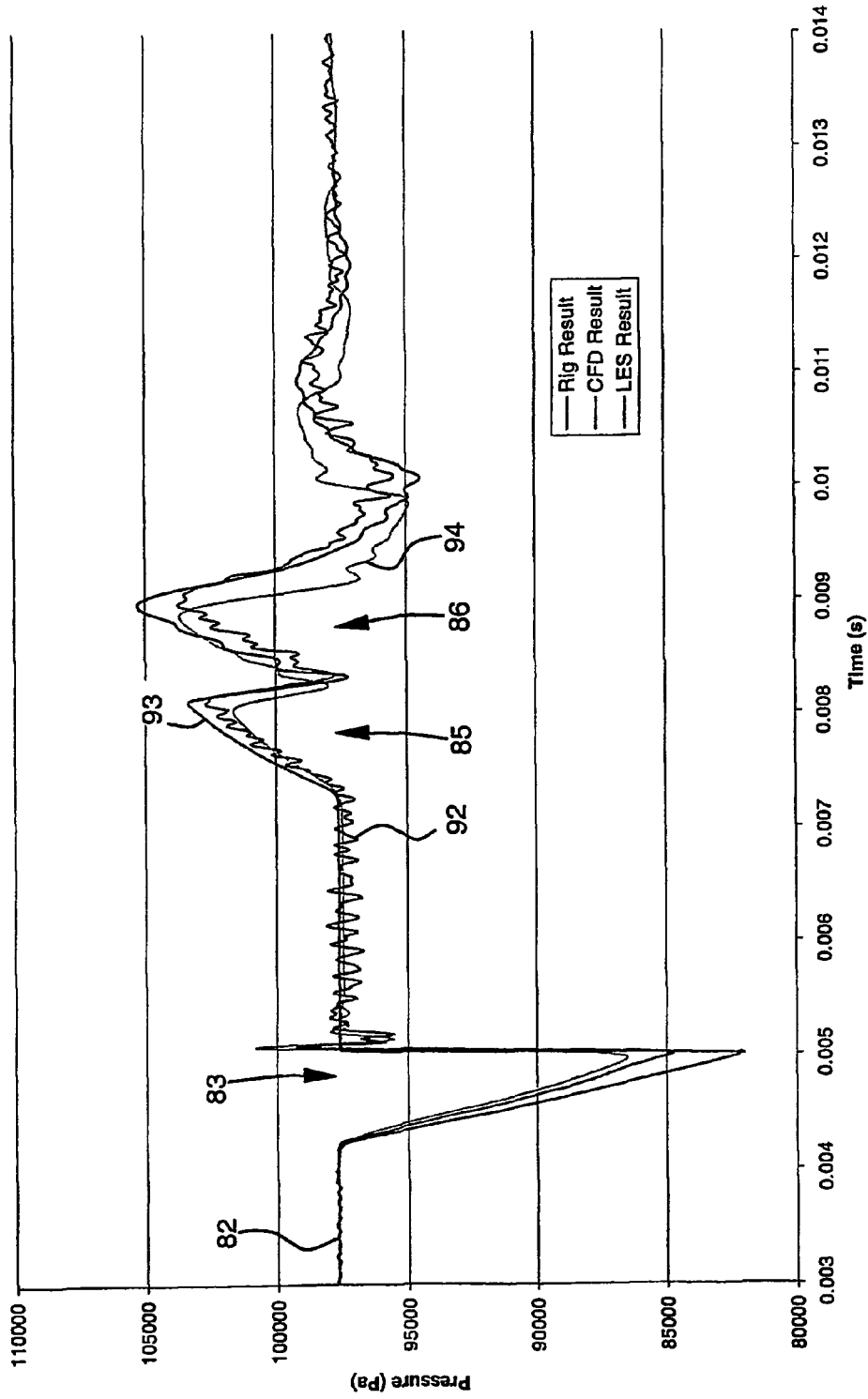
FIGS. 6 through 13 are graphical comparisons of the shock-tube rig test data of FIG. 4 against numerical calculations performed by computer modeling programs, FLUENT CFD and LES.
Figure 7:
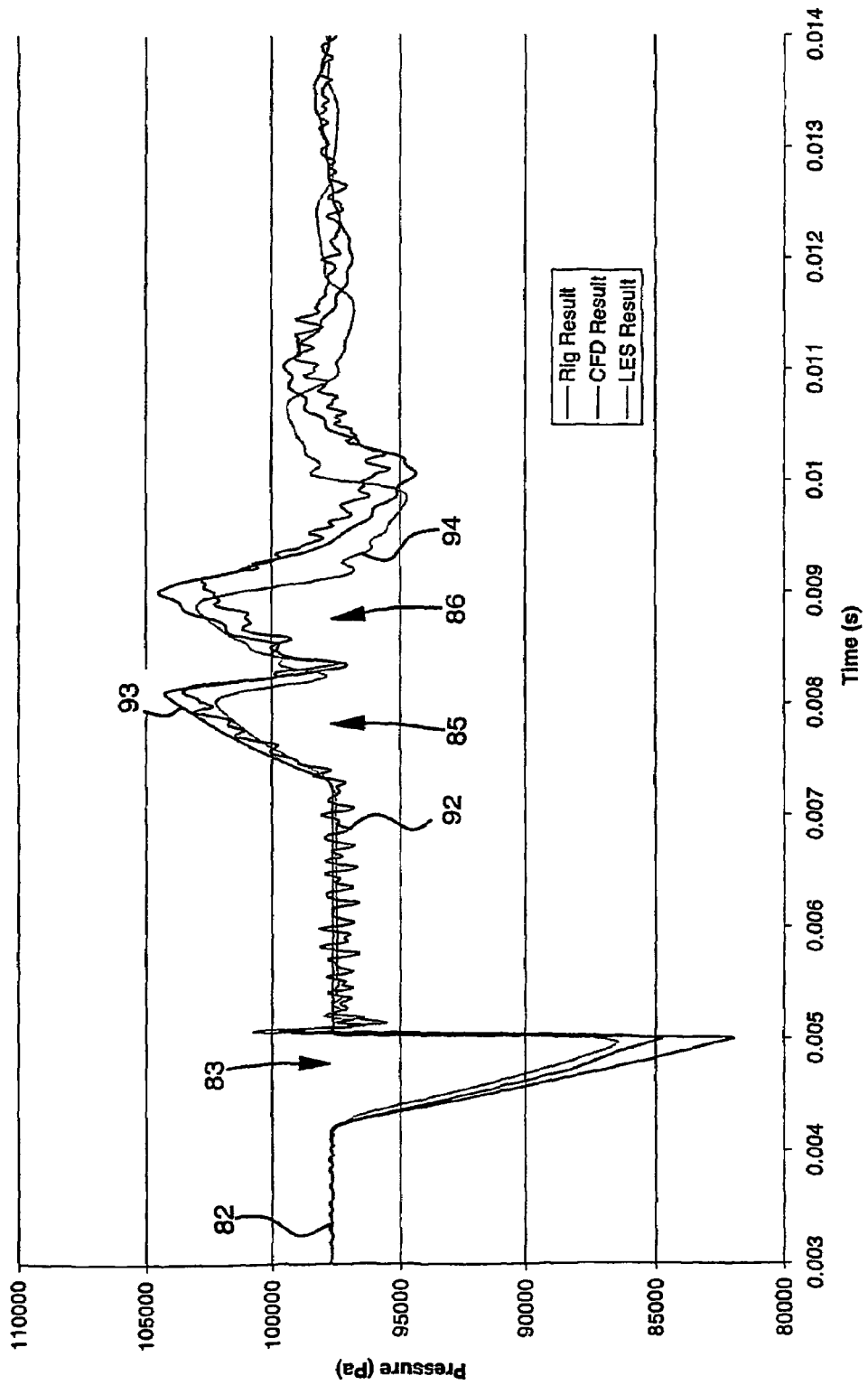
Figure 8:
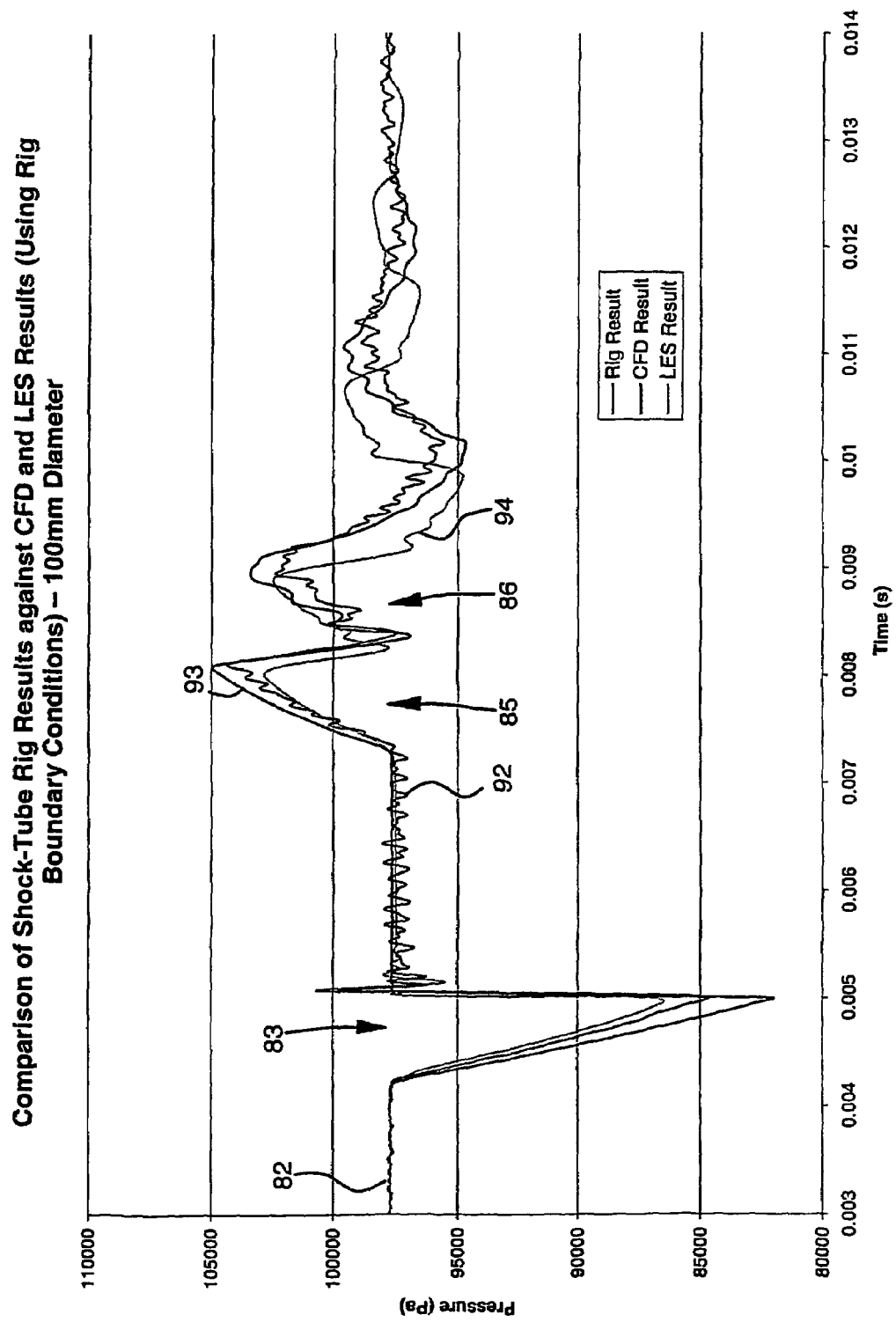
Figure 9:
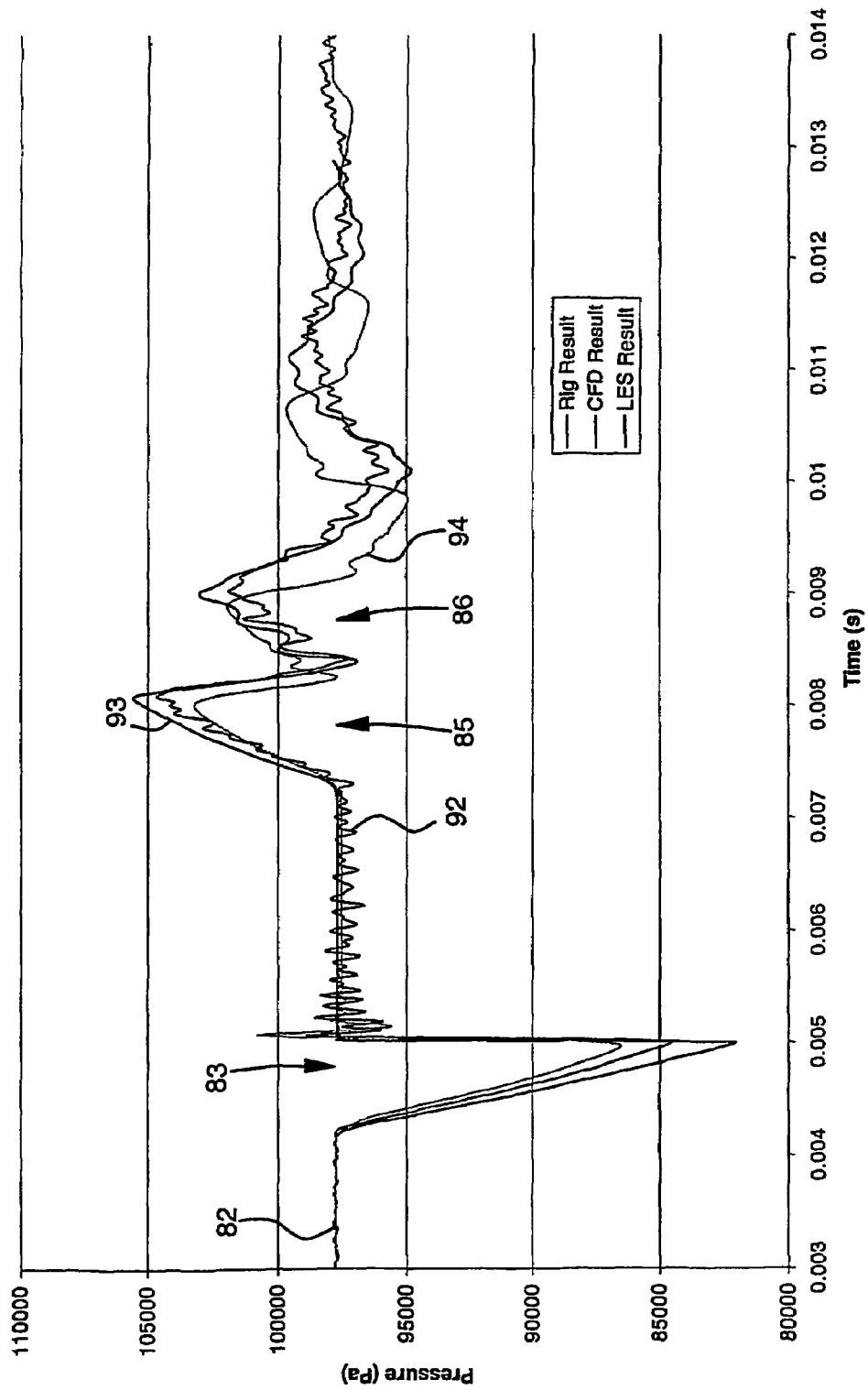
Figure 10:
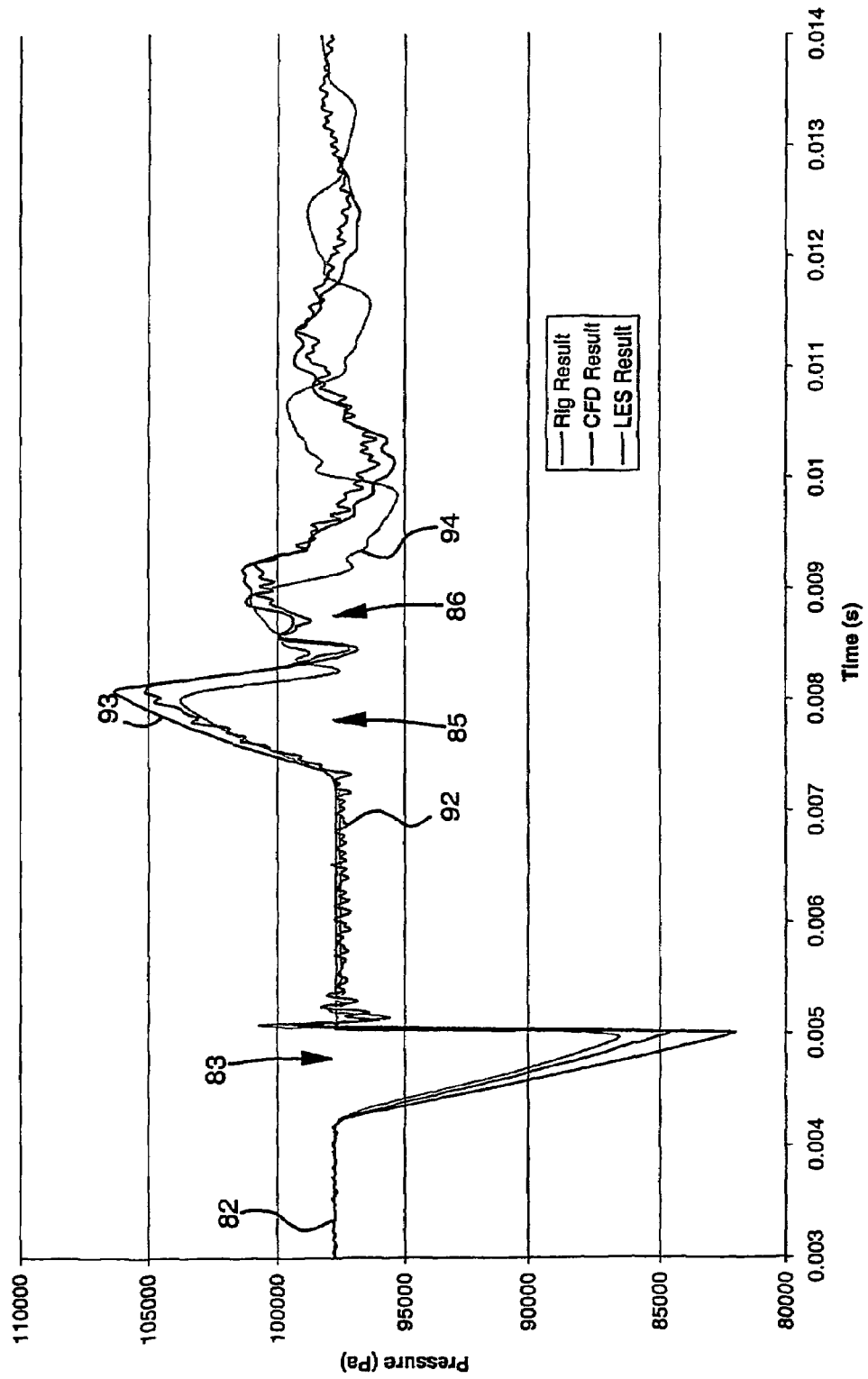
Figure 11:
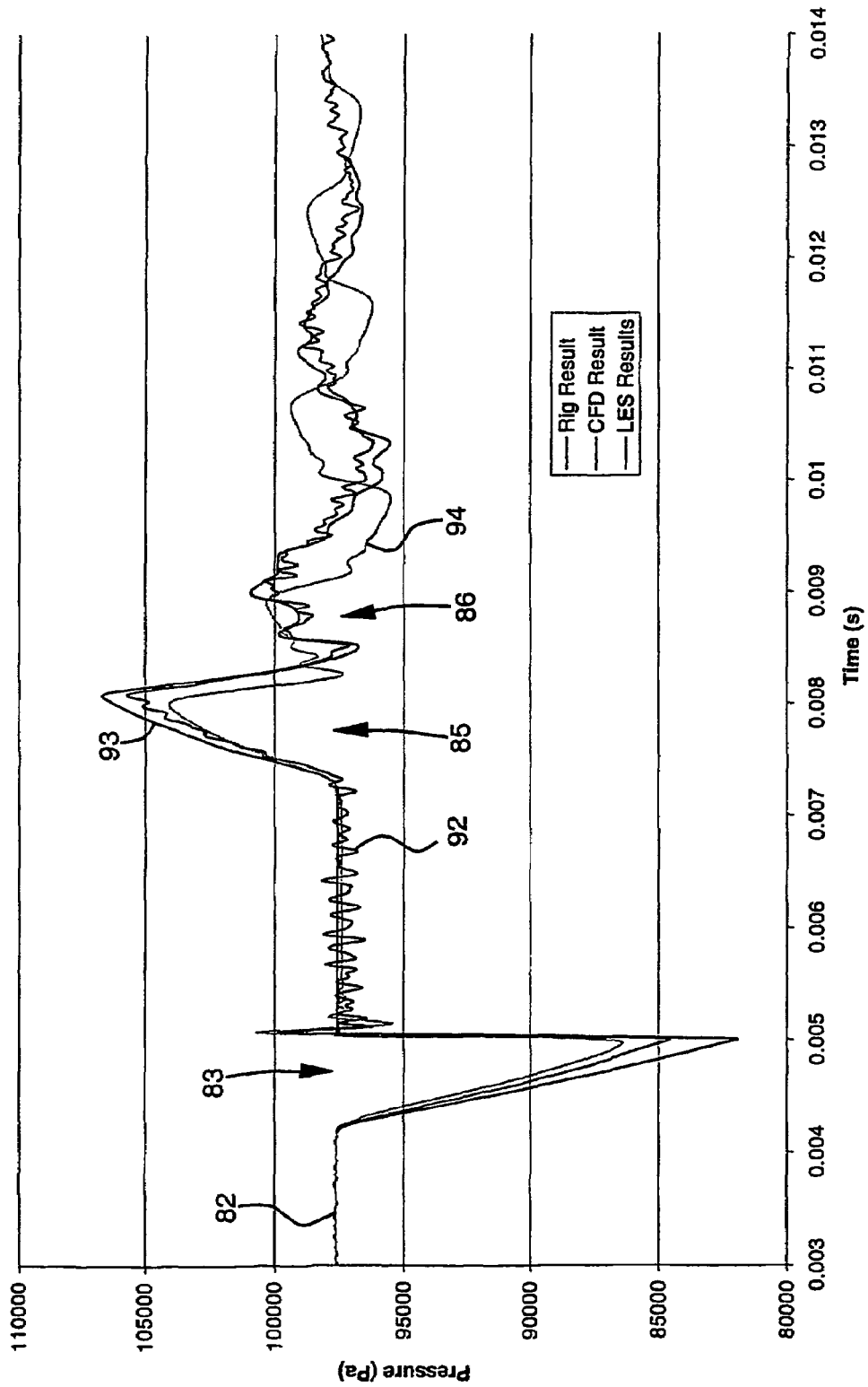
Figure 12:
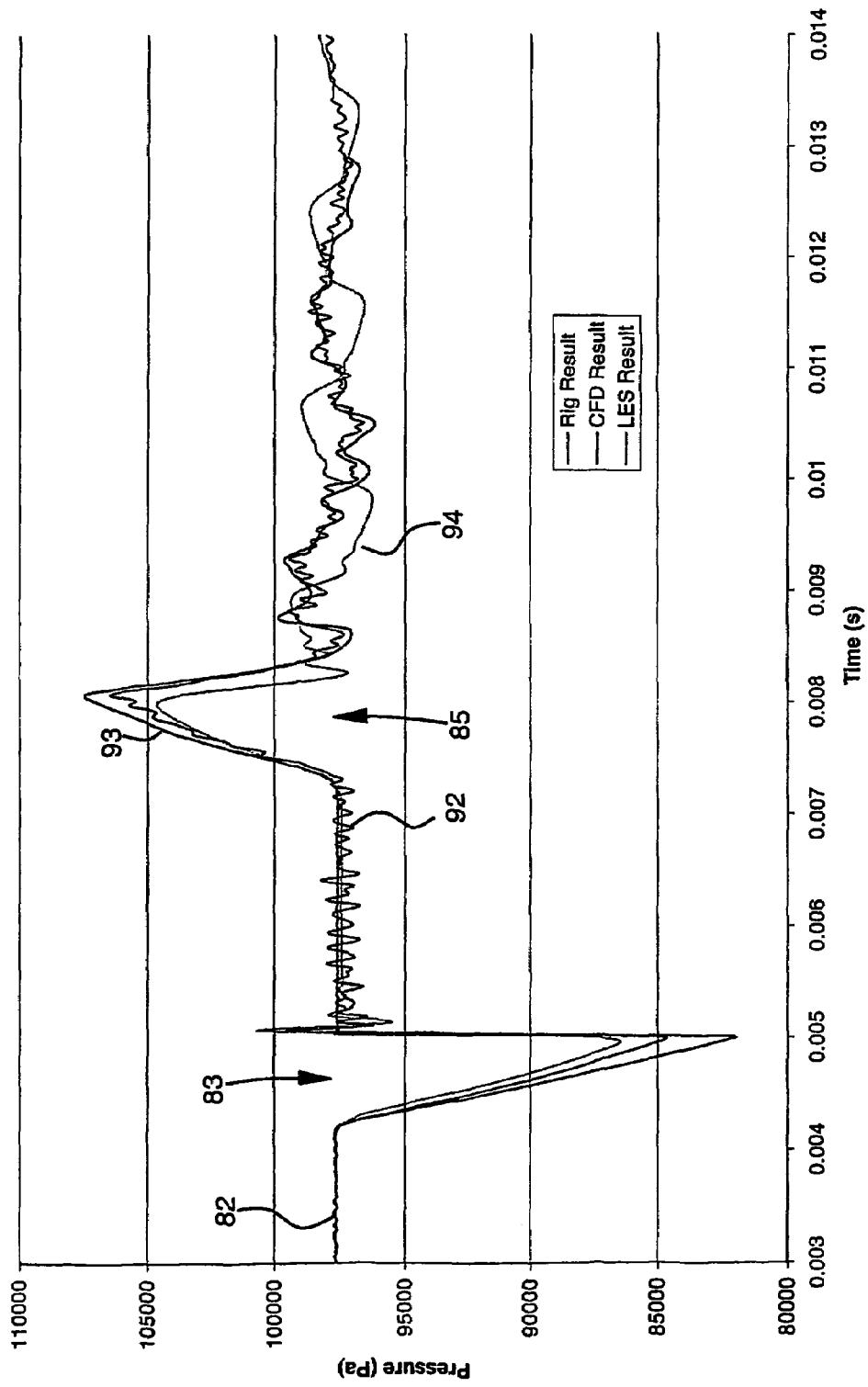
Figure 13:
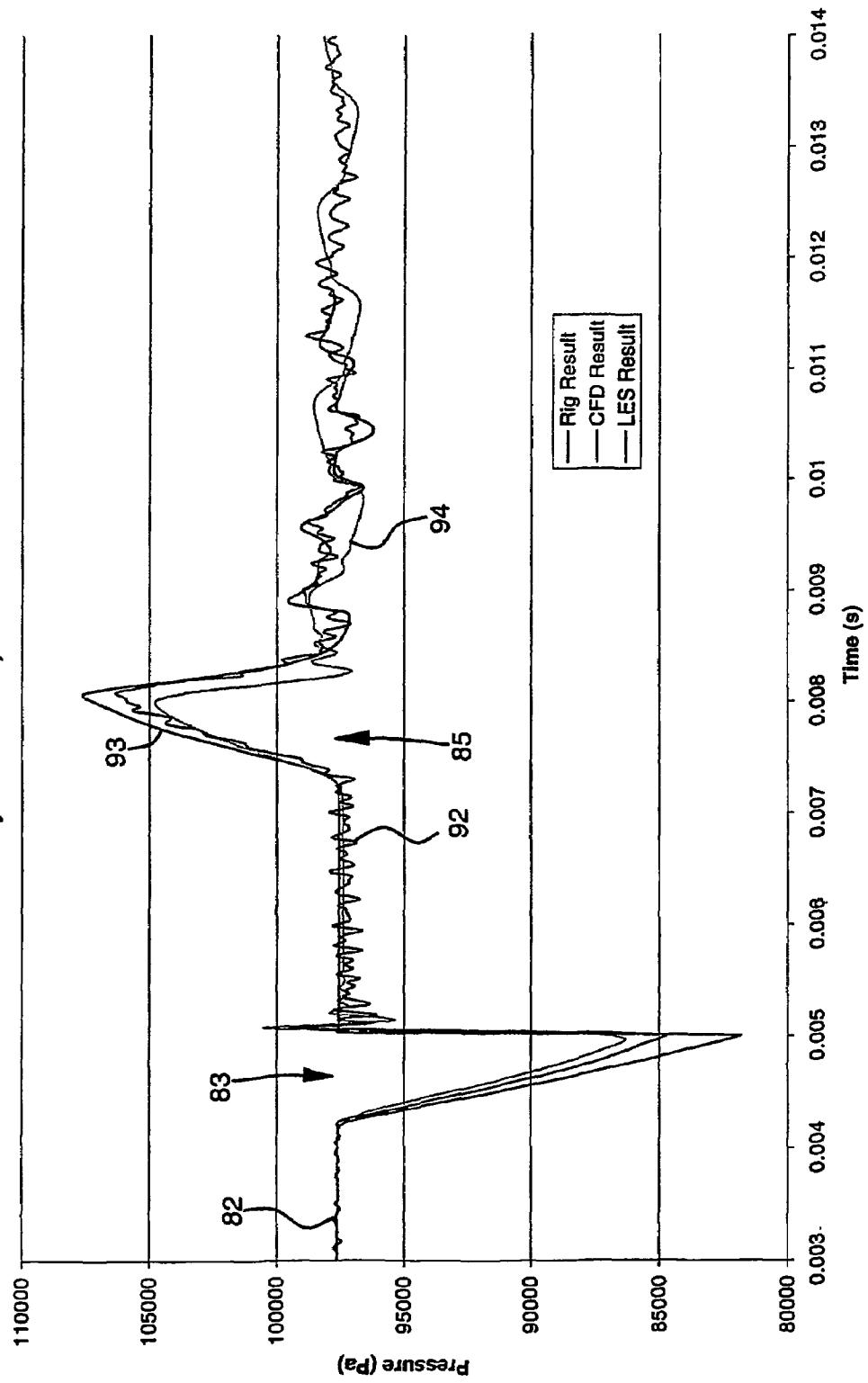

Referring to FIG. 6, there is shown a comparison of the shock-tube rig test data (jagged line curve at 92) from FIG. 4 for the 80 mm second diameters against numerical calculations performed with commercially available modeling codes, FLUENT CFD and Lotus Engine Simulation (LES). The higher peaking curve 93 is the CFD result, and the lower peaking curve 94 is the LES result. The CFD results agree well with experimental shock-tube data in terms of the timing of the reflected waves. The input rarefaction wave was of greater magnitude in the CFD calculations, and hence the corresponding reflections were also of greater magnitude. The LES calculations predicted lower input and reflected wave magnitudes; however, the major discrepancy was in terms of the timing of the second reflected wave. An upper trumpet of 150 mm was specified in the LES model, and the results showed that this specified length underestimates the acoustic length. In order to improve the agreement between the LES model and the shock-tube test, an extra length or 'end-effect' must be added to the physical upper trumpet length.

FIGS. 7-13 present the comparison results for remaining second tube diameters of 90, 100, 110, 130, 150, 200 and 250 mm, respectively. In the case of the 200 and 250 mm diameter second tubes 64 (FIGS. 12 and 13), the first reflection, from first tube 63, is the only one of any significance. The second and subsequent reflections are essentially non-existent. Such behavior is exactly like that from prior tests run with just the first tube, indicating that the trumpet (second tube 64) is effectively not present at these diameters.

Figure 14:
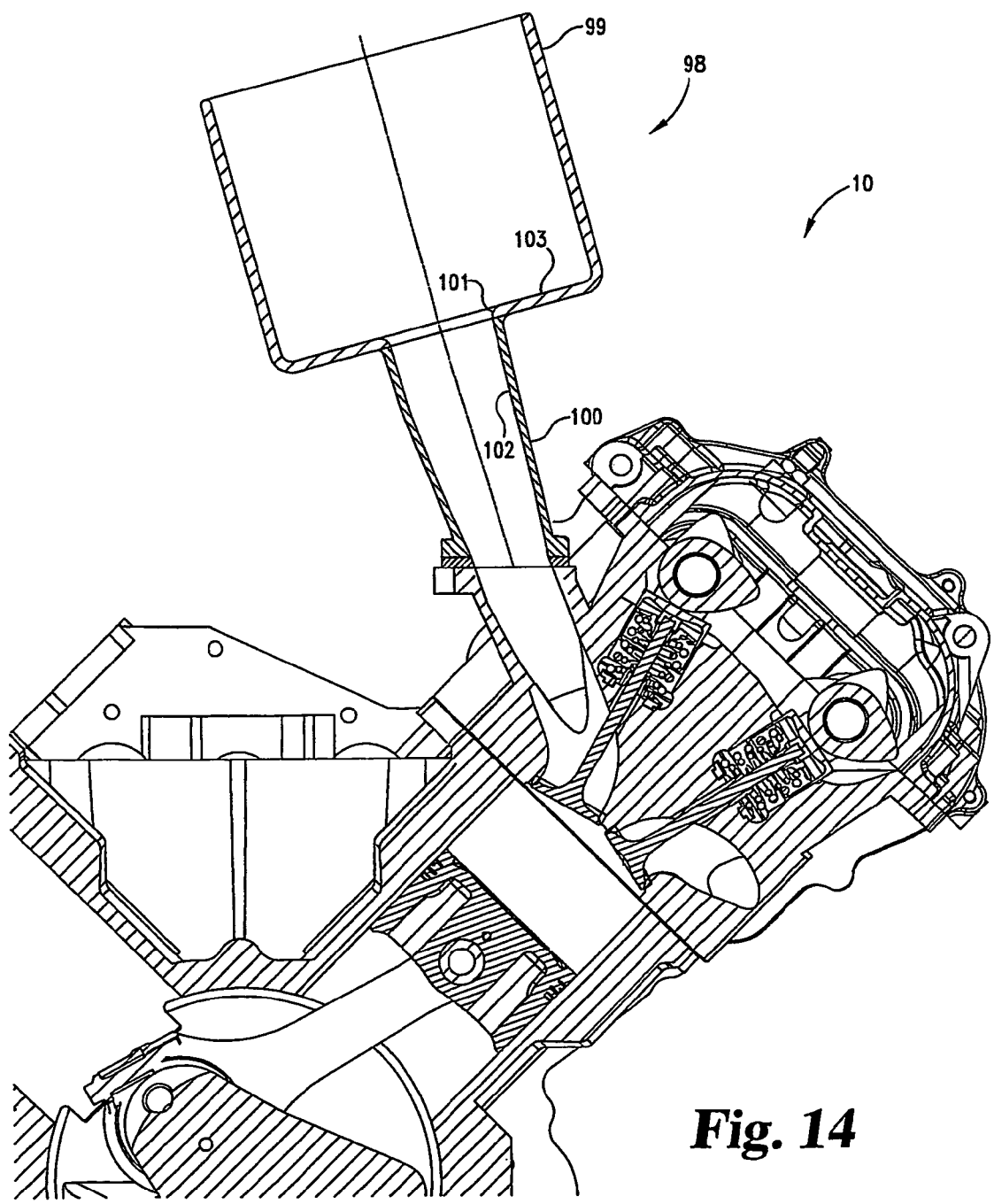
FIGS. 14 through 18 are side, cross-sectional views of intake tubes connected with the engine 10 of FIG. 2 in accordance with alternative embodiments of the present invention.

The preferred increase in diameter from lower trumpet 41 to upper trumpet 42 is between about 68 percent and 217 percent, and more preferably between about 90 percent and 130 percent. Thus for example in FIG. 14, an alternative embodiment intake tube 98 is shown connected to engine 10 where the inner diameter of upper trumpet 99 is about 204 percent larger than the transition diameter of lower trumpet 100. It is noted that there is a transition edge 101 defined where the inner wall 102 of lower trumpet 100 (or any other lower trumpet) transitions into floor 103 (or any other transition shape). It is preferred that transition edge 101 not be a sharp edge, but rather be rounded with an appropriate radius to avoid development of an undesirable boundary layer thereat that would impede air flow. One example of such rounding is shown at rounded edge 101 on intake tube 98 of FIG. 14.

Figure 15:
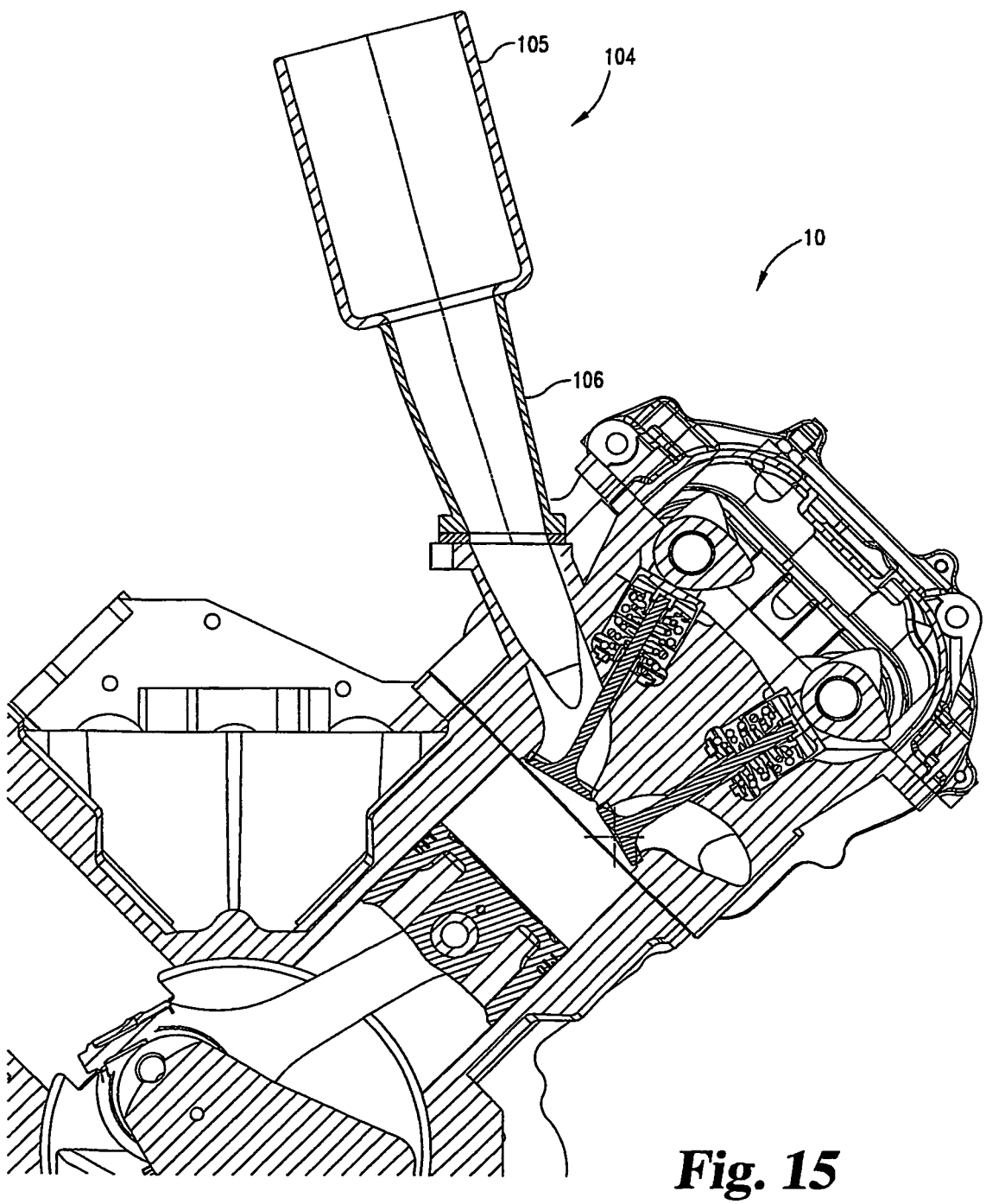

In FIG. 15 there is shown an intake tube 104 connected with engine 10 in accordance with another embodiment of the present invention. The inner diameter of its upper trumpet 105 is about 68 percent larger than the transition diameter of its lower trumpet 106.

Figure 16:
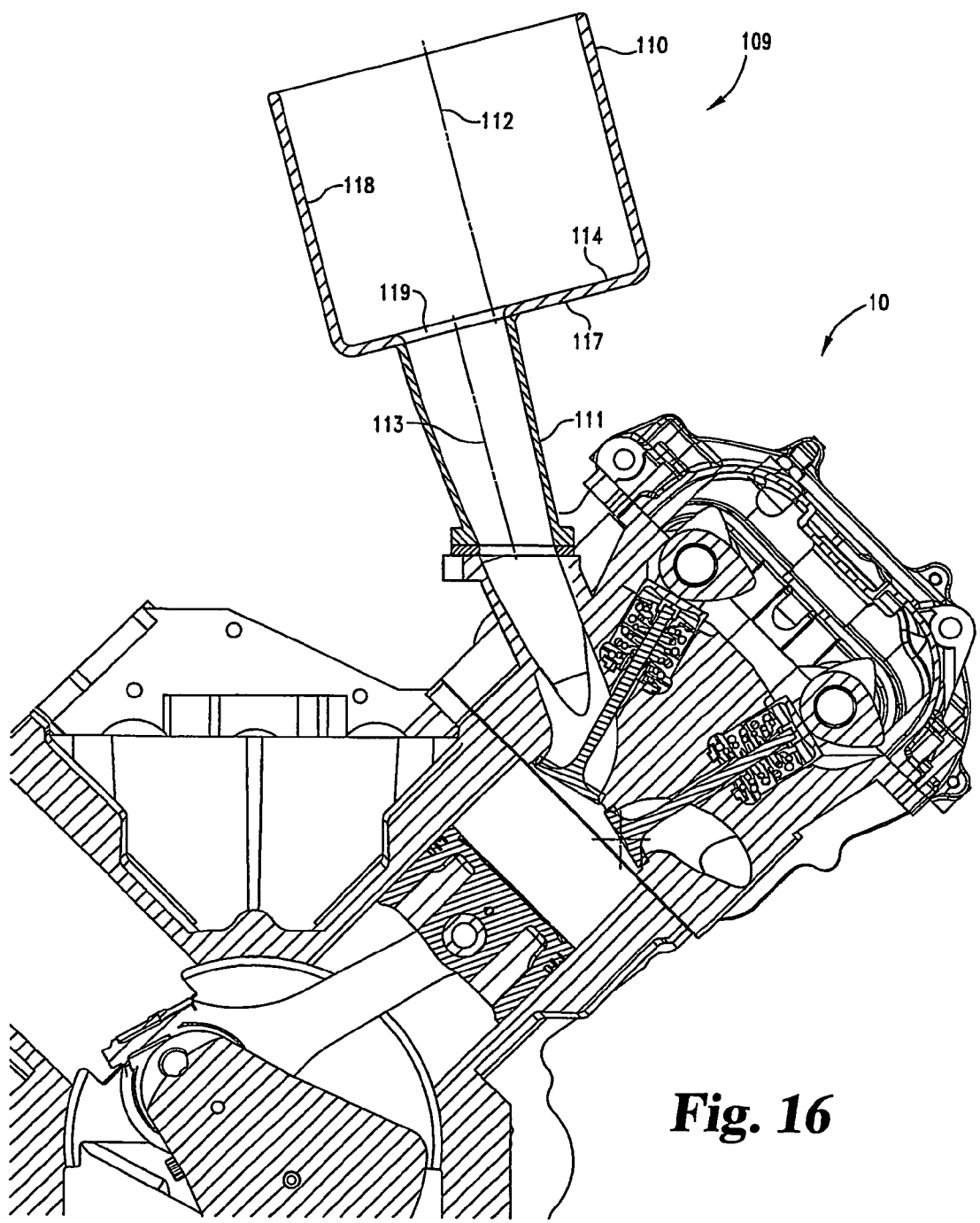

Referring to FIG. 16 there is shown an intake tube 109 connected with engine 10 in accordance with another embodiment of the present invention. Unlike the intake tubes 40, 98 and 104 of the embodiments of FIGS. 2, 14 and 15 wherein the upper and lower trumpets were generally coaxial with one another, at least near the transition diameter of the lower trumpet, the upper trumpet 110 of intake tube 109 is offset from lower trumpet 111, as shown. The inner diameter of upper trumpet 110 is about 202 percent larger than the transition diameter of its lower trumpet 111. The offset of upper trumpet centerline 112 from lower trumpet centerline 113 is about 25 percent of the radius of the floor 114 of transition section 117 or about 12.5 percent of the expansion diameter of upper trumpet 110. Such offset does not preclude a significant second acoustic reflection and permits engine designers to more easily fit intake manifolds in the limited space available. The offset may be made all the way out to the inner wall 118 of upper trumpet 110. That is, the offset may be as much as the difference between the upper trumpet radius and the lower trumpet radius. If the shape of the hole 119 in floor 114, between upper and lower trumpets 110 and 111 is other than round, the offset may be greater than the difference between upper and lower trumpet radii. Further, the amount of offset is not related or dependant on the diametrical ratio between upper and lower trumpets.

It is noted that the terms "centerline" and "axis" may be used interchangeably herein. Where the upper or lower trumpet of an embodiment is not perfectly cylindrical, the "centerline" is meant to refer to the approximate or mean centerline of such trumpet. The length or axial length of a trumpet or tube is generally intended to mean the length of such trumpet or tube along its axis or centerline.

Figure 17:
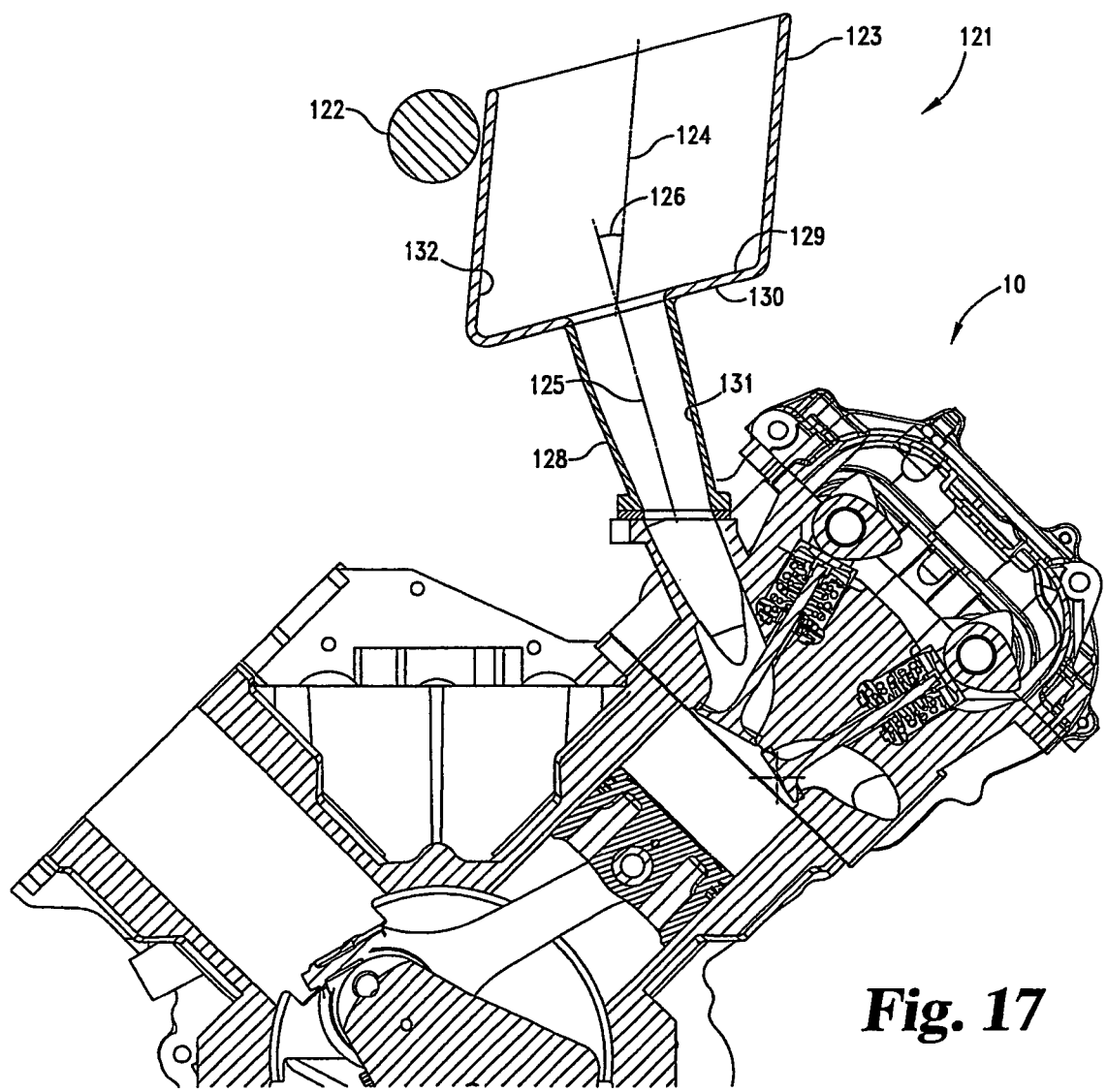

Referring to FIG. 17 there is shown an intake tube 121 connected with engine 10 in accordance with another embodiment of the present invention. Like intake tube 109 of FIG. 16, which facilitates creative packing of engine components, the non-standard shape of intake tube 121 allows it to fit around another engine component or structural member 122. This flexibility is provided by an upper trumpet 123, the centerline or axis 124 of which is at an offset angle 126 with the centerline 125 of lower trumpet 128. Upper trumpet 123 is shaped like an oblique cylinder, and the floor 129 of transition section 130 between upper and lower trumpets 123 and 128 is here generally perpendicular to the centerline 125 and/or inner wall 131 of lower trumpet 128. Alternative embodiments contemplate floor 129 being perpendicular to the upper trumpet centerline 124 or being perpendicular to neither centerline 124 or centerline 125. Alternative embodiments contemplate combining the oblique cylinder configuration of FIG. 17 with the offset axis configuration of FIG. 16. The inner diameter of upper trumpet 123, measured parallel to floor 129, is about 217 percent larger than the transition diameter of its lower trumpet 111. It is believed that the offset angle 126 can be as great as 45 degrees or more and still retain the benefit of the second acoustic reflection. In the embodiment of FIG. 17, upper trumpet centerline 124 forms about a 20 degree angle with lower trumpet centerline 125.

Figure 18:
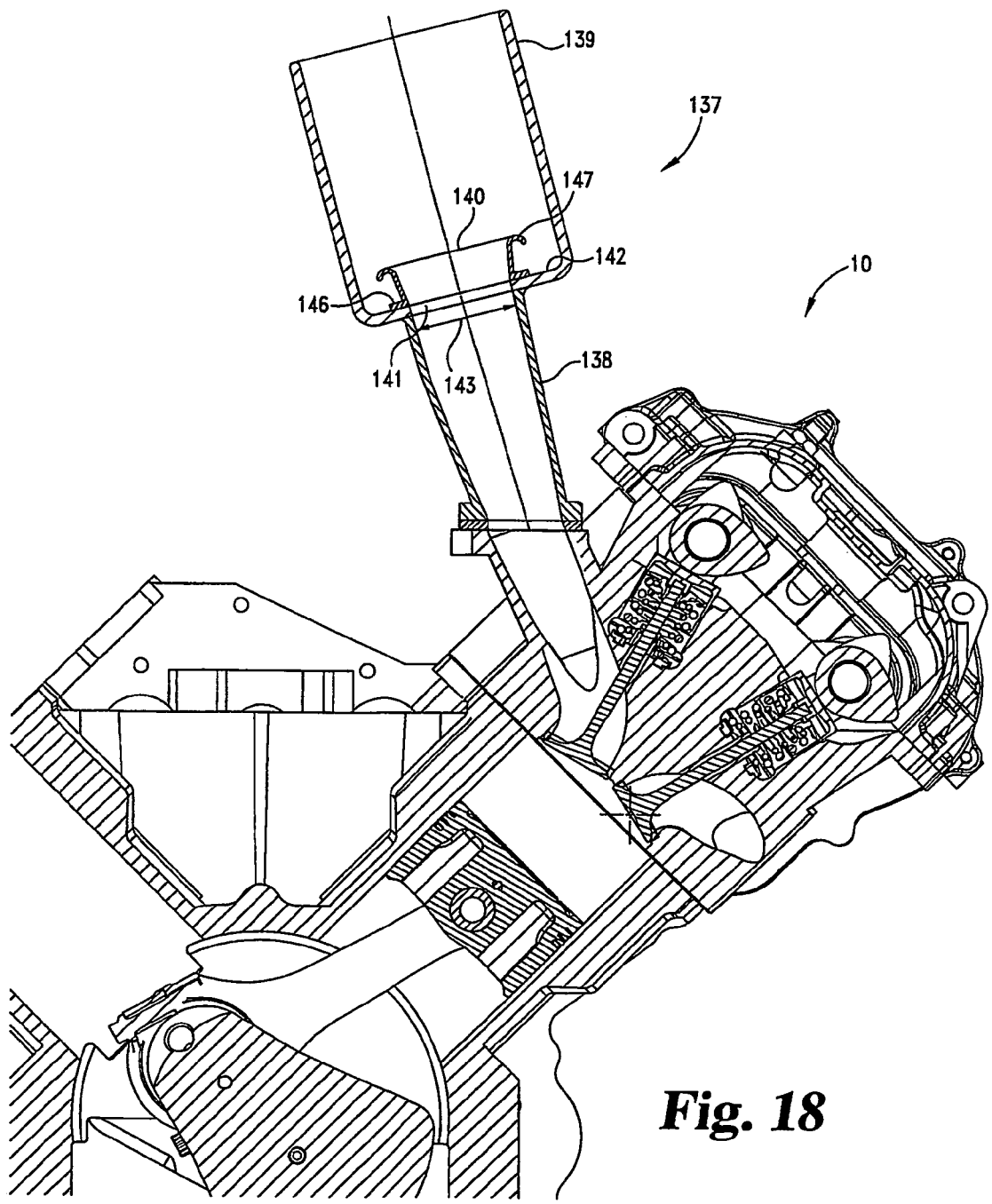

Referring to FIG. 18 there is shown an intake tube 137 connected with engine 10 in accordance with another embodiment of the present invention. Intake tube 137 is like intake tube 40 of FIG. 2, having mating lower and upper trumpets 138 and 139 (or a single, homogeneously formed intake tube, if desired), and with the addition thereto of an insert 140 which acts as a lower trumpet extender. Insert 140 has an inner cylindrical or slightly frustoconical shape, the bottom end of which mates with the diameter of hole 141 in floor 142, which mates with the transition diameter 143 of lower trumpet 138 to provide a smooth airflow transition thereat. Insert 140 also includes a lower annular flange 146 for mounting to floor 142, which mounting is by any appropriate means such as welding, glue or fasteners. The upper end 147 of insert 140 is bell-mouthed, like outboard end 33 of intake tube 21; however, any suitable shape for the outboard end 33 is contemplated. The inner diameter of upper trumpet 139 is about 98 percent larger than transition diameter 143, but more importantly, with the slight divergence of insert 140, about 78 percent larger than the diameter at the exit of bell mouth upper end 147. Such insert can thus be used to easily change both the timing and magnitude of first and second shock wave reflections.

Referring to FIGS. 19 and 20, upper trumpet 139 of FIG. 18 is shown with examples of alternative inserts. Insert 148 has a diverging, conical surface 149 that extends all the way from the inner wall 150 of lower trumpet 138 to the inner wall 151 of upper trumpet 139. Insert 149 has an arcuate inner surface 152 that likewise extends from inner surface 150 to inner surface 151. Alternative embodiments are contemplated wherein the size and/or shape of such inserts are varied widely. For example and without limitation inserts 148 and 149 may be made taller or shorter (i.e. the distance they extend above floor 142), of steeper or shallower angle or curvature, and/or of lesser outer diameter (that is, not extending all the way to the inner wall of upper trumpet 139. Such inserts can essentially be of any configuration to temper the magnitude, timing or other characteristic of the first and/or second reflection, and all such variations of inserts are contemplated by the present invention.

Referring to FIG. 21, there is shown an intake tube 158 in accordance with another embodiment of the present invention. Lower trumpet 159 of intake tube 158 is the same as the lower trumpet of prior embodiments (e.g. lower trumpet 138 of FIG. 18), while its upper trumpet 160 is a tubular elbow with a constant diameter about its arcuate centerline 161. The inner diameter of upper trumpet 160 is about 82 percent larger than transition diameter of lower tube 159.

Referring to FIG. 22, there is shown an intake tube 164 in accordance with another embodiment of the present invention. Lower trumpet 165 of tube 164 is the same as the lower trumpet of prior embodiments (e.g. lower trumpet 138 of FIG. 18), while its upper trumpet 166 is detachable from transition section 167. To vary the effective height of upper trumpet 166 a desired number of ring-like spacers 168 are applied coaxially between upper trumpet 166 and transition section 167. An appropriate connection device such as a bracket or resilient cord and hook 168 secures this upper trumpet assembly together. The inner diameter of upper trumpet 166 is about 204 percent larger than transition diameter of lower trumpet 165.

Figure 23:
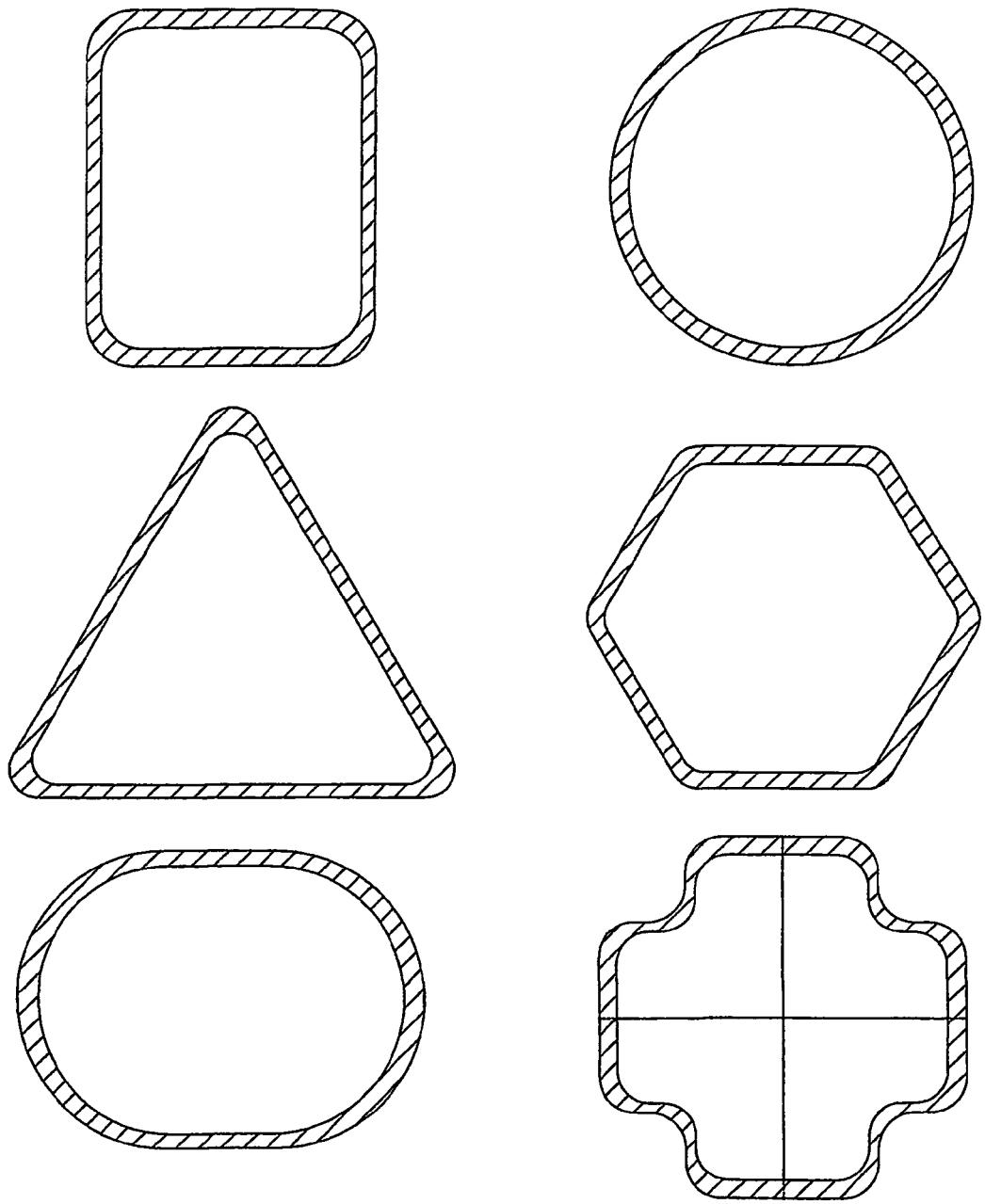
FIG. 23 is a sample collection of cross-sectional views of intake tube shapes in accordance with alternative embodiments of the present invention.

Either or both of upper and lower trumpets described herein are primarily contemplated to be of circular cross-section. Alternative embodiments are contemplated wherein the cross-section of either or both upper and lower trumpet tubes may be of substantially any shape. Shown in FIG. 23 are but a few possible examples of such alternative cross-sections.

Figure 24:
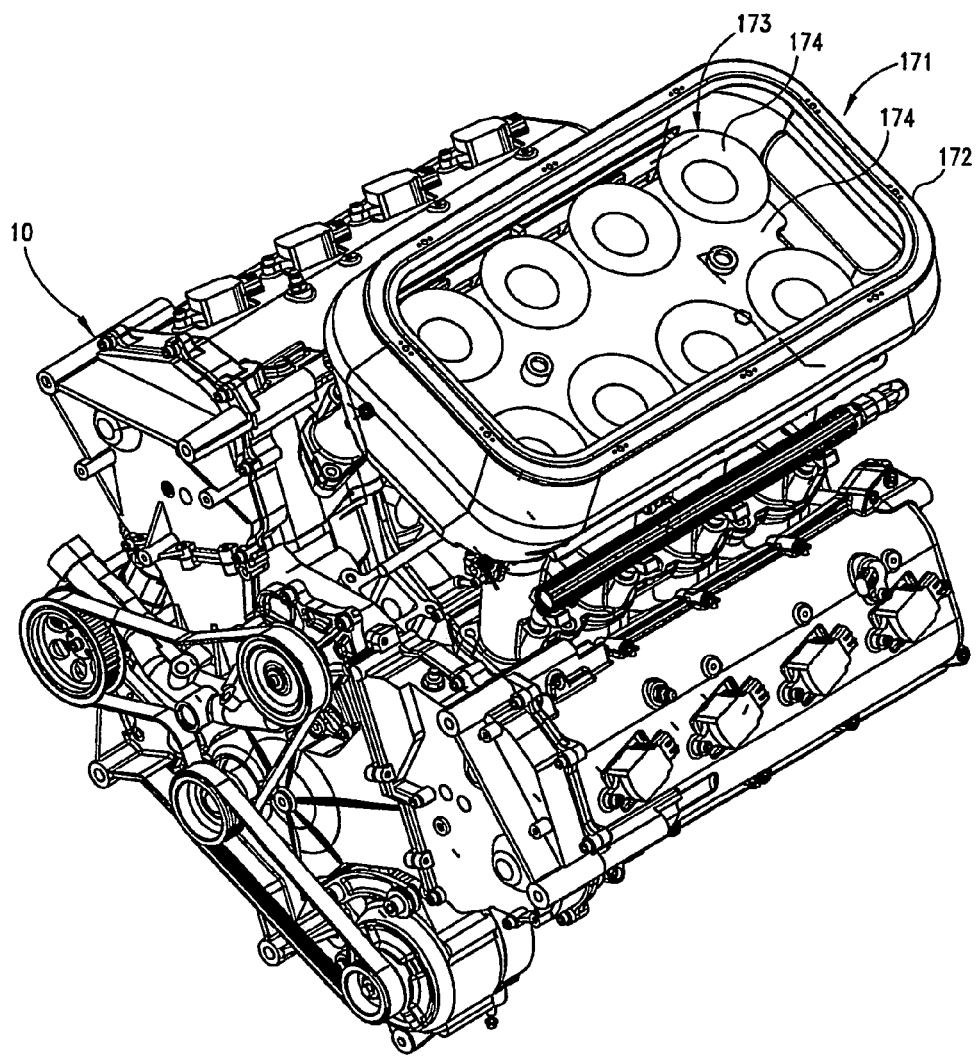
FIG. 24 is a perspective view of an induction system 171 connected with an engine 10 in accordance with another embodiment of the present invention.

Referring to FIG. 24, there is shown an induction system 170 connected with an engine 10 in accordance another embodiment of the present invention. Induction system 171 includes an airbox 172 into which each of the upper trumpets 173 extend and terminate. Upper trumpets 173 are of any configuration as shown, described or suggested herein (such as upper trumpet 42 of FIG. 2 or upper trumpet 123 of FIG. 17). Upper trumpets 173 of FIG. 24 are shown with a over-sized mouth 174 and are mutually interconnected at their upper ends by a trumpet plate 176.

Figure 25:
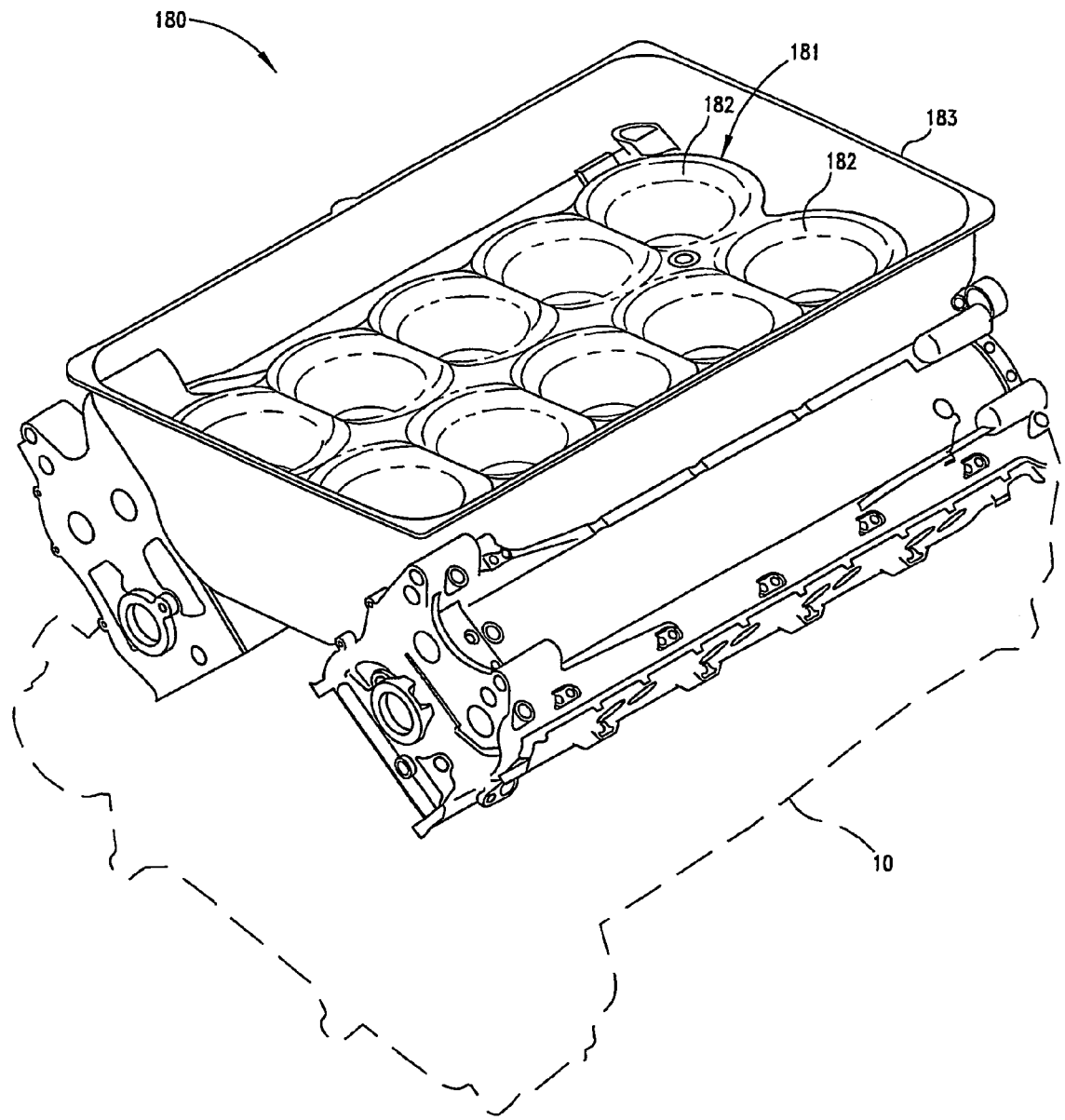
FIG. 25 is a perspective view of an induction system 180 connected with an engine 10 in accordance with another embodiment of the present invention.

Referring to FIG. 25, there is shown an induction system 180 connected with an engine 10 in accordance another embodiment of the present invention. As with induction systems described and shown herein (such as induction systems 38 or 171), induction system 180 comprises a series of lower trumpets (not shown in FIG. 25) that extend up from the engine's intake ports. Instead of a single, discrete upper trumpet connected to each lower trumpet, as described and shown in FIGS. 2 and 14-22, the upper trumpets are all combined in a single trumpet pack 181. Trumpet pack 181 is essentially a collection of individual upper trumpets 182 (like any of the upper trumpets shown, described or suggested herein, such as upper trumpet 42 of FIG. 2 or upper trumpet 123 of FIG. 17), such individual trumpets 182 being formed as a homogeneous, integrally formed unit. Trumpet pack 181, and perhaps a portion of the lower trumpets to which it is connected, extend into and terminates in an airbox 183. Thus in the present embodiment, a ten cylinder engine requires ten upper trumpets 182, which are provided by single trumpet pack 181. This configuration facilitates maintenance and assembly as it is simpler to install or change just one trumpet pack as opposed to ten individual trumpets.

Figure 26:
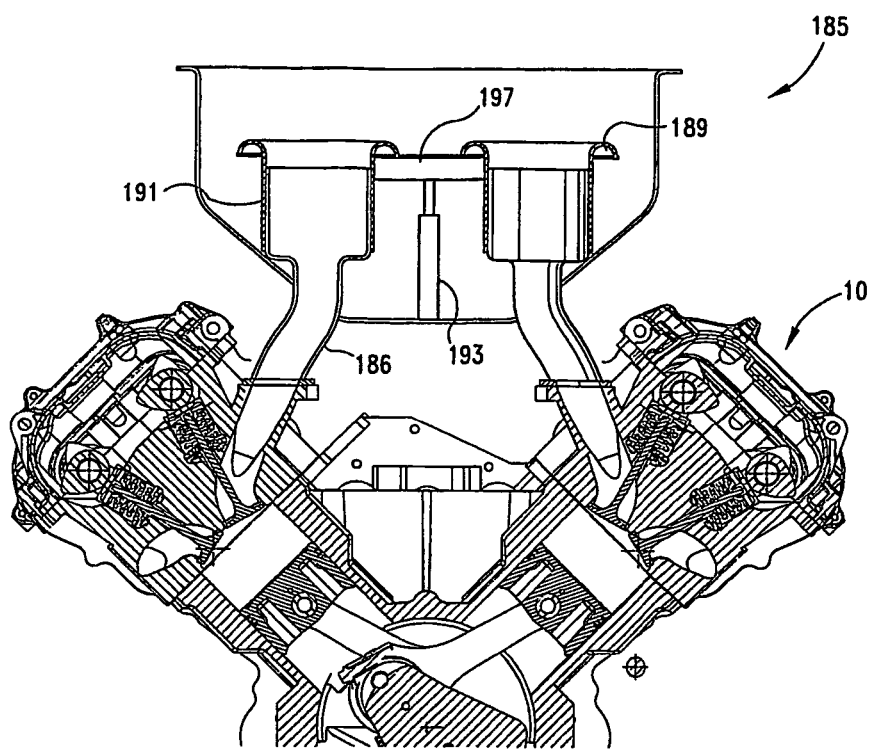
FIG. 26 is an end, partially cross-sectional view of an induction system 185 connected with an engine 10 in accordance with another embodiment of the present invention and showing trumpet extender pack 189 in the down position.
Figure 27:
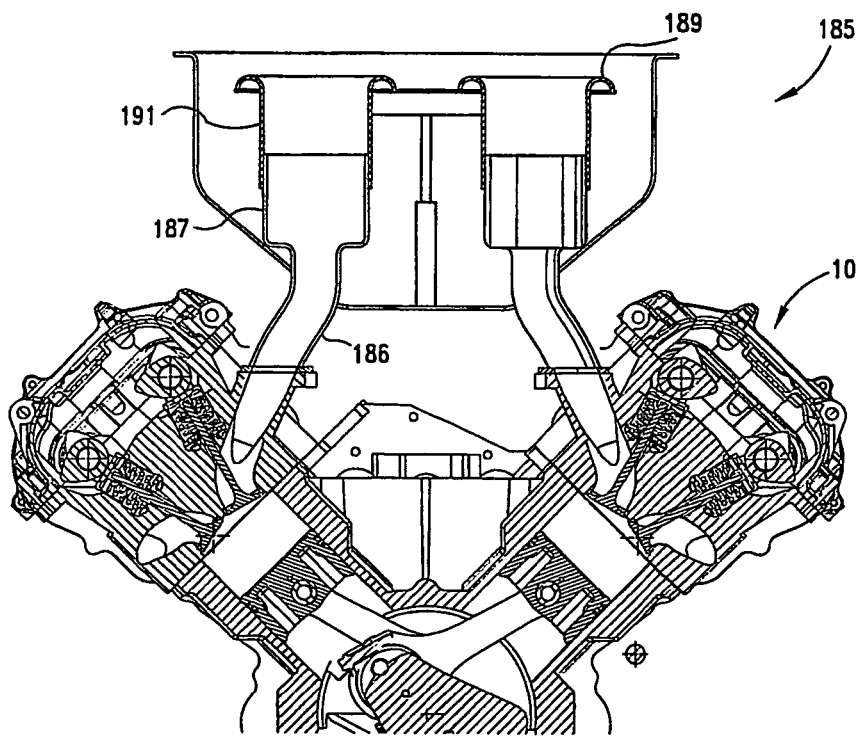

Referring to FIGS. 26 and 27, there is shown an induction system 185 connected with an engine 10 in accordance another embodiment of the present invention. As with induction systems described and shown herein (such as induction systems 38 or 171), induction system 185 includes a lower trumpet 186 for each engine cylinder and an upper trumpet 187 connected at the top of each lower trumpet 186. The upper trumpets 187 extend into and terminate in an airbox 188. Airbox 188 is supported by engine 10 or by upper or lower trumpets 187/186, as desired. Induction system 185 further includes a trumpet extender pack 189 that comprises a collection of trumpet sleeves 191. Each trumpet sleeve 191 is sized and configured to snugly receive an upper trumpet 187 therein and to slide telescopically up and down along its upper trumpet 187. The trumpet sleeves 191 are mutually interconnected by a crossplate 192 to move together as a unit. A hydraulic actuator and linear potentiometer unit 193 is connected between airbox 188 and trumpet extender pack 189 to provide remote raising and lowering of trumpet extender pack 189, as desired, between full down and full up positions (FIGS. 26 and 27, respectively) to adjust and tune the length of the intake tubes while driving. Connection of actuator unit 193 to the vehicle's computer control center (not shown) and control thereof is known in the art. The linear potentiometer, (or any appropriate apparatus) permits the vehicle's computer control center, driver, and/or technician to know position and direction of movement of the trumpet extender pack 189.

Figure 28:
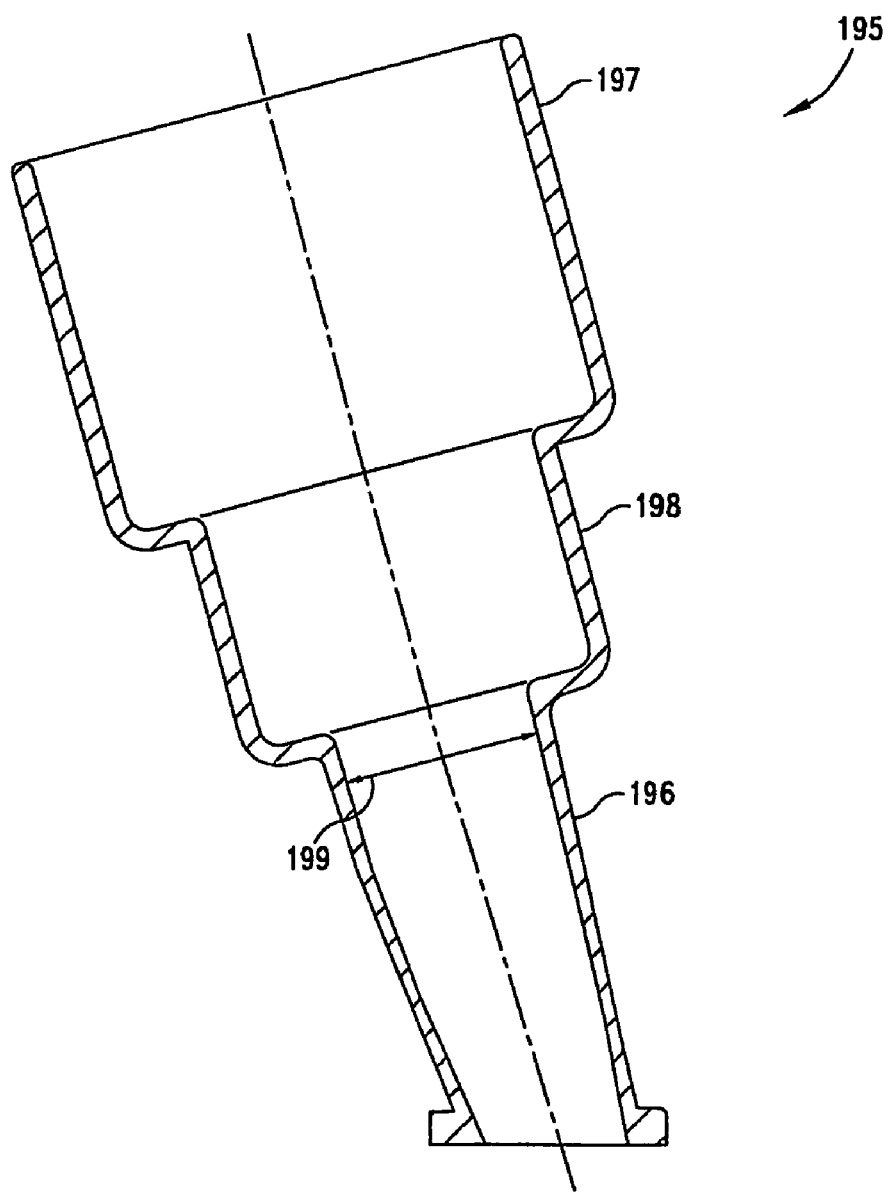
FIG. 28 is cross-sectional view of an intake tube 195 in accordance with an alternative embodiment of the present invention.

Referring to FIG. 28, there is shown a three stage intake tube 195 in accordance with an alternative embodiment of the present invention. Intake tube 195 includes a lower trumpet 196, an upper trumpet 197 and at least one intermediate trumpet 198. The inner diameter of upper trumpet 197 is about 150 percent larger than the transition diameter 199 of lower tube 196. The diameter of intermediate trumpet 198 is between the lower tube transition diameter 199 and the diameter of upper trumpet 197, preferably about midway therebetween. Alternative embodiments are contemplated wherein intake tubes such as the two stage intake tube 40 of FIG. 2 or three stage intake tube 195 of FIG. 28 are four or more stage intake tubes wherein there is at least one lower trumpet connected with the engine intake port and at least one upper trumpet connected to and above the lower trumpet, the upper trumpet having a diameter that is between about 68 percent and about 217 percent greater than the transition diameter of the lower trumpet. Such four or more stage intake tube may have one or more additional trumpets between the lower trumpet and the upper trumpet and/or may have one or more additional trumpets yet above the at least one upper trumpet. In the latter case, the diameter of the uppermost trumpet may be greater than 217 percent greater than the transition diameter of the lower trumpet.

Alternative embodiments are contemplated wherein the upper and lower trumpets comprise a single, homogeneous piece that can be connected to the connection flange 45 of an engine. Alternatively, a separate lower trumpet 41 can be secured to connection flange 45, and a variety of differently shaped upper trumpets (i.e. 42, 110 and 123) could be connected as needed to achieve the desired effect secondary intake tuning effect.

With a constant lower trumpet length, as the length of upper trumpet 42 is decreased, the reflection (due to upper trumpet 42) occurs earlier, and as the length of upper trumpet 42 is increased, the reflection (due to upper trumpet 42) occurs later. Thus, to maximize volumetric efficiency, selection of the relative trumpet lengths will depend on the various engine specifics, such as, and without limitation, anticipated rpm ranges and torque requirements in such ranges.

The volumetric expansion from lower trumpet to upper trumpet has been described in terms of an increase in diameter. However, with regard to tubes having non-circular cross-sections, the volumetric increase from lower to upper trumpet may be given in terms of an increase in area from just below the transition section (i.e. section 43 of FIG. 2) to just above such transition section. Thus for example, referring to FIG. 2, the transition area would be the inner cross-sectional area of lower trumpet 41, perpendicular to centerline 44 at the transition diameter arrow 48. The expansion diameter would be the inner cross-sectional area of upper trumpet 42, perpendicular to centerline 54 at the expansion diameter arrow 55. Where the dimensions of an upper trumpet perpendicular to its centerline are not constant (i.e. a frustoconical upper trumpet), the expansion diameter or area for purposes of the volumetric increase is located just above the transition section. It is preferred that the expansion area be between about 182 percent and 905 percent greater than the transition area, and more preferably that the expansion area be between about 360 percent and 530 percent greater than the transition area.

Engine design varies widely and continues to evolve, and the present invention is contemplated to apply to all such designs. For example, and without limitation, the present invention is contemplated to apply to normally aspirated piston engines, turbocharged engines, rotary engines and diesel engines. The present invention is contemplated for use with any internal combustion engine that draws air through an air intake for mixture with fuel and for combustion of such mixture in a combustion chamber.

While the invention has been illustrated and described in detail in the drawings and foregoing description, the same is to be considered as illustrated and not restrictive in character, it being understood that only the preferred embodiment and a few alternative embodiments have been shown and described and that all changes and modifications that come within the spirit of the invention are desired to be protected.

What is claimed is:

1. An induction system for an internal combustion engine having a combustion chamber and an intake port in periodic communication with the combustion chamber, comprising:
    an intake tube having a lower trumpet and an upper trumpet, each having an upper end, a lower end and a length;
    a transition section extending between the upper end of said lower trumpet and the lower end of said upper trumpet;
    wherein said lower trumpet is connectable at its lower end to the intake port of an engine and has an inner transition diameter proximal its upper end, and wherein said upper trumpet has an inner expansion diameter that is between about 68 percent and 217 percent greater than the transition diameter.

2. The induction system of claim 1 wherein expansion diameter is between about 90 percent and 130 percent greater than the transition diameter.

3. The induction system of claim 1 wherein said upper trumpet is generally cylindrical with a constant expansion diameter.

4. The induction system of claim 1 wherein each of said upper and lower trumpets have centerlines that are mutually aligned.

5. The induction system of claim 1 wherein each of said upper and lower trumpets have centerlines and the centerline of said upper trumpet is offset from the centerline of said lower trumpet.

6. The induction system of claim 5 wherein the centerline of said upper trumpet is offset from the centerline of said lower trumpet by about 25 percent of the expansion diameter of said upper trumpet.

7. The induction system of claim 1 wherein the inner expansion diameter is about 68 percent greater than the transition diameter.

8. The induction system of claim 1 wherein the inner expansion diameter is about 217 percent greater than the transition diameter.

9. The induction system of claim 1 wherein each of said upper and lower trumpets have centerlines, and the centerline of said upper trumpet forms an offset angle with the centerline of said lower trumpet, the offset angle being greater than zero degrees.

10. The induction system of claim 9 wherein the offset angle is not less than about 20 degrees.

11. The induction system of claim 1 wherein said transition section has a floor and wherein said induction system further includes a trumpet insert positioned against said floor and extending up into said upper trumpet, said insert effectively extending the length of said lower trumpet and decreasing the length of said upper trumpet.

12. The induction system of claim 11 wherein said insert has an inner insert diameter, at least a portion of which is substantially the same as the transition diameter of said lower trumpet.

13. The induction system of claim 12 wherein the inner surface of said insert is generally cylindrical.

14. The induction system of claim 12 wherein the inner surface of said insert is generally frustoconical.

15. The induction system of claim 12 wherein the inner surface of said insert is generally arcuate.

16. The induction system of claim 12 wherein at least a portion of the insert diameter is substantially the same as the expansion diameter of said upper trumpet.

17. The induction system of claim 1 wherein each of said upper and lower trumpets have centerlines, and the centerline of said upper trumpet is substantially straight.

18. The induction system of claim 1 wherein each of said upper and lower trumpets have centerlines, and the centerline of said upper trumpet is substantially curved.

19. The induction system of claim 1 wherein each of said upper and lower trumpets have centerlines, and the centerline of said upper trumpet is angled.

20. The induction system of claim 1 further including a plurality of spacers sized and configured to be interposed between said upper trumpet and said transition section to vary the overall length of said upper trumpet.

21. An induction system for an internal combustion engine having a combustion chamber and an intake port in periodic communication with the combustion chamber, comprising:
    an intake tube having a lower trumpet and an upper trumpet, each having an upper end, a lower end and a length;
    a transition section extending between the upper end of said lower trumpet and the lower end of said upper trumpet;
    wherein said lower trumpet is connectable at its lower end to the intake port of an engine and has an inner transition area proximal its upper end, and wherein said upper trumpet has an inner expansion area that is between about 182 percent and 905 percent greater than the transition area.

22. The induction system of claim 21 wherein the expansion area is between about 360 percent and 530 percent greater than the transition diameter.

23. An induction system for an internal combustion engine having a plurality combustion chambers and intake ports in periodic communication with the combustion chambers, comprising:
    a plurality of lower trumpets, each having an upper end, a lower end and a length;
    a trumpet pack including a plurality of interconnected upper trumpets, each upper trumpet having an upper end, a lower end and a length;
    a transition section extending between the upper end of each lower trumpet and the lower end of each upper trumpet;
    wherein said lower trumpets are each connectable at their lower ends to the intake ports of an engine and have an inner transition diameters proximal their upper end, and wherein said upper trumpets each have an inner expansion diameter that is between about 68 percent and 217 percent greater than the transition diameters.

* * * * *